（12） United States Patent
Fujita et al.

(10) Patent No.: US 8,000,087 B2
(45) Date of Patent: Aug. 16, 2011

(54) GAS INSULATED SWITCHGEAR

(75) Inventors: Daisuke Fujita, Tokyo (JP); Takuya Otsuka, Tokyo (JP); Hitoshi Sadakuni, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/738,769

(22) PCT Filed: Nov. 29, 2007

(86) PCT No.: PCT/JP2007/073087
§ 371 (c)(1),
(2), (4) Date: Apr. 19, 2010

(87) PCT Pub. No.: WO2009/069214
PCT Pub. Date: Jun. 4, 2009

(65) Prior Publication Data
US 2010/0238610 A1   Sep. 23, 2010

(51) Int. Cl.
*H02B 13/02*   (2006.01)
(52) U.S. Cl. ........ 361/612; 361/604; 361/618; 361/619; 361/621; 361/637; 218/43; 218/45; 218/69; 218/73; 218/75
(58) Field of Classification Search .......... 361/602–621, 361/637, 673, 829, 830, 832; 218/2, 7, 10–14, 218/43–47, 63–75, 80–84, 152–158; 307/142, 307/147, 149; 200/48 A, 48 B
See application file for complete search history.

(56) References Cited

U.S. PATENT DOCUMENTS

| 4,503,481 | A | * | 3/1985 | Fujiya et al. | 361/612 |
| 4,638,403 | A | * | 1/1987 | Amano et al. | 361/612 |
| 4,862,319 | A | * | 8/1989 | Suzuyama et al. | 361/612 |
| 4,890,193 | A | * | 12/1989 | Tsubaki | 361/612 |
| 4,967,307 | A | * | 10/1990 | Itou et al. | 361/618 |

(Continued)

FOREIGN PATENT DOCUMENTS

JP   61-066511 A   4/1986
(Continued)

OTHER PUBLICATIONS

International Search Report (PCT/ISA/210) for PCT/JP2007/073087 dated Mar. 4, 2008.

(Continued)

*Primary Examiner* — Michael V Datskovskiy
(74) *Attorney, Agent, or Firm* — Buchanan Ingersoll & Rooney PC

(57) ABSTRACT

Each integral unit is structured by arranging partial units (I), (II), and (Ill) side by side, while line-side devices are branched from positions between the partial units adjacent to each other. Each of the partial units is structured by connecting a current transformer and a disconnector in sequence to each of upper and lower outlets horizontally drawn out from a lateral face of a vertical-type circuit breaker in the same direction. Any two partial units positioned adjacent to each other are connected in series by connecting the disconnectors included therein with a connection bus. The line-side devices are positioned to oppose the circuit breakers while the disconnectors are interposed therebetween. The switchgear includes a plurality of integral units. Two ends of each of the integral units are respectively connected to two main buses that are provided in an upper position and a lower position while the disconnectors are interposed therebetween.

16 Claims, 11 Drawing Sheets

U.S. PATENT DOCUMENTS

| | | | |
|---|---|---|---|
| 5,373,415 A | 12/1994 | Tawaratani | |
| 5,589,674 A * | 12/1996 | Berger et al. | 218/71 |
| 5,625,530 A * | 4/1997 | Inami et al. | 361/604 |
| 5,898,565 A * | 4/1999 | Yamauchi et al. | 361/612 |
| 6,515,247 B1 * | 2/2003 | Tsuzura et al. | 218/43 |
| 6,560,091 B1 * | 5/2003 | Takahoshi et al. | 361/604 |
| 6,762,386 B2 * | 7/2004 | Itou et al. | 218/43 |
| 7,417,827 B2 * | 8/2008 | Tsuchida et al. | 360/234.5 |
| 2006/0215356 A1 | 9/2006 | Takao et al. | |

FOREIGN PATENT DOCUMENTS

| | | | |
|---|---|---|---|
| JP | 61-072007 U | | 5/1986 |
| JP | 61-092106 A | | 5/1986 |
| JP | 63-164309 U | | 10/1988 |
| JP | 5-033610 U | | 4/1993 |
| JP | 6-062513 A | | 3/1994 |
| JP | 6-078422 A | | 3/1994 |
| JP | 6-088121 U | | 12/1994 |
| JP | 7-193925 A | | 7/1995 |
| JP | 8-223716 A | | 8/1996 |
| JP | 408223716 A | * | 8/1996 |
| JP | 8-331715 A | | 12/1996 |
| JP | 10-257620 A | | 9/1998 |
| JP | 11-341627 A | | 12/1999 |
| JP | 2006-271021 A | | 10/2006 |

OTHER PUBLICATIONS

Written Opinion (PCT/ISA/237) for PCT/JP2007/073087 dated Mar. 4, 2008.

* cited by examiner

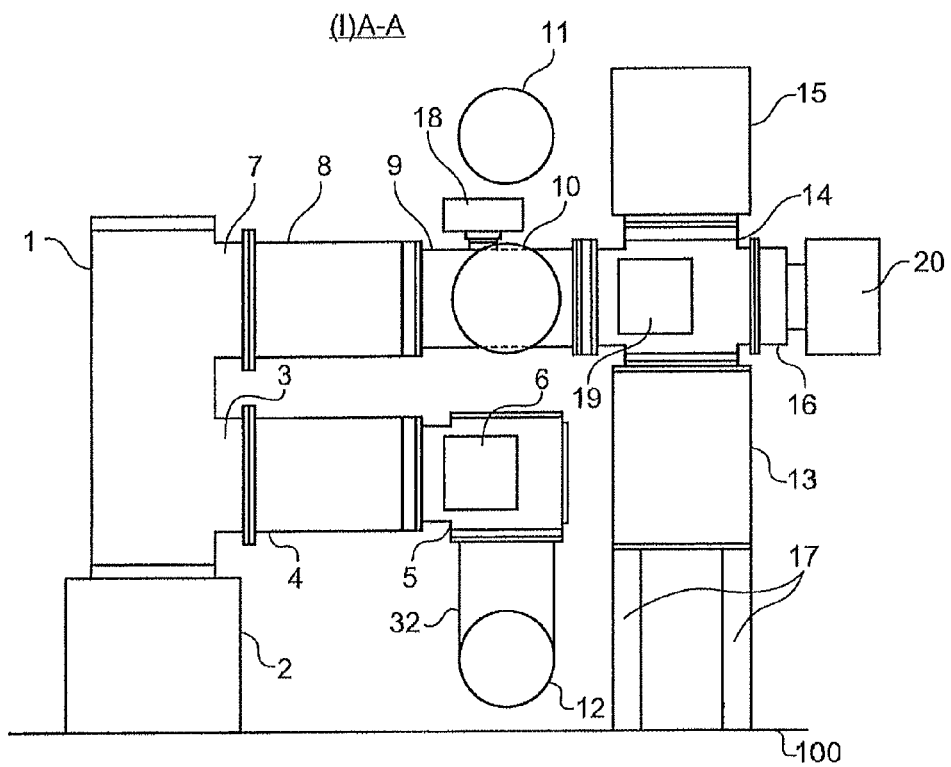
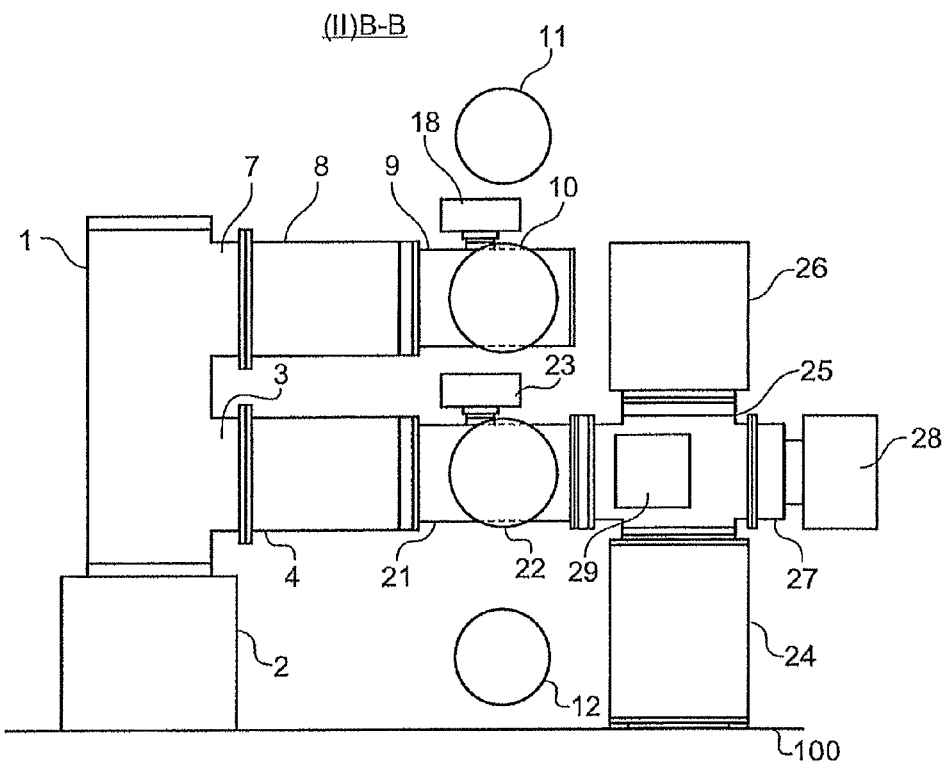

(III)C-C

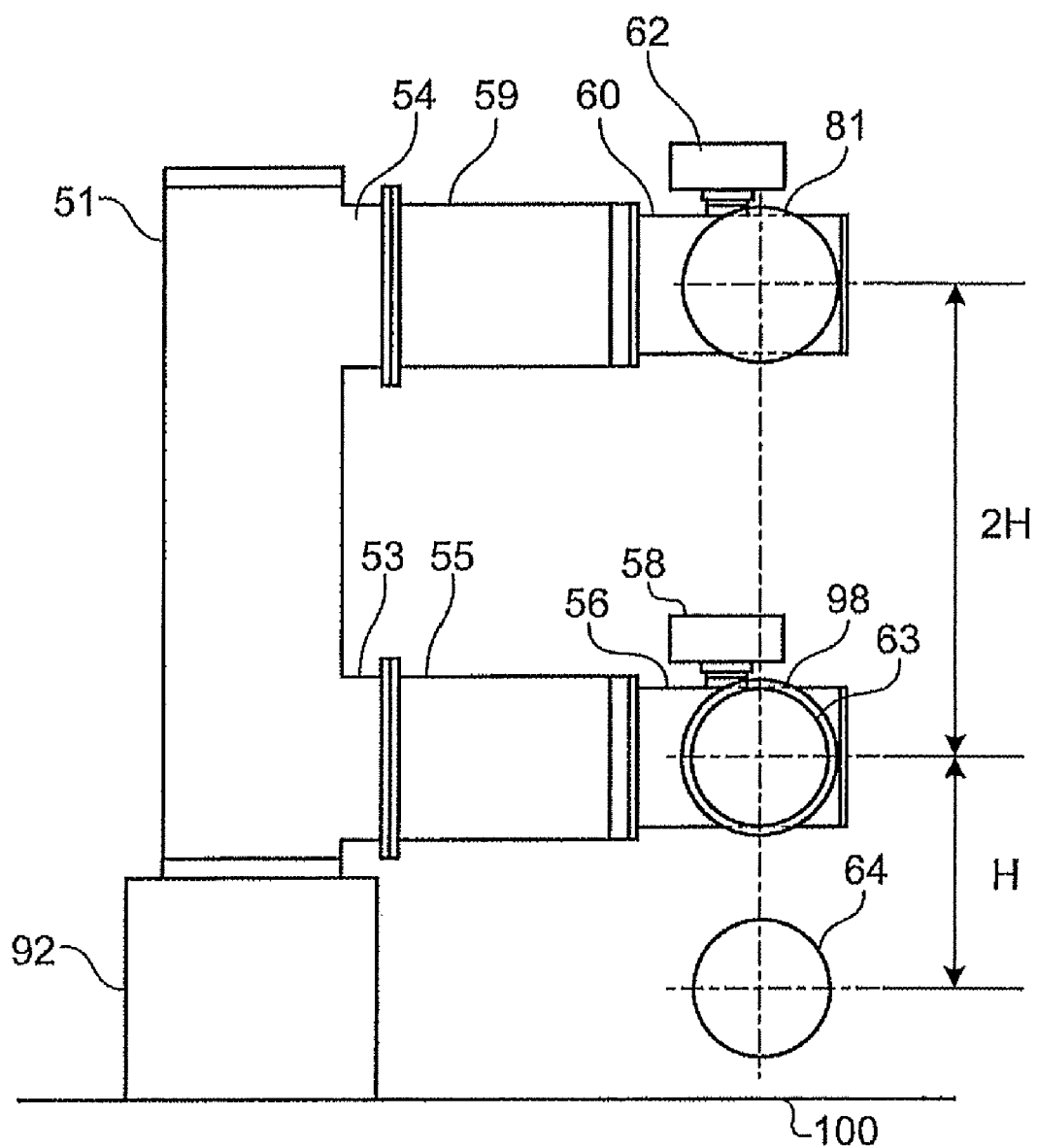

# GAS INSULATED SWITCHGEAR

TECHNICAL FIELD

The present invention relates to 1-½-Circuit-Breaker(CB)-type gas insulated switchgear.

BACKGROUND ART

Gas insulated switchgear used in electricity supply stations including substations and electric power plants is structured by disposing necessary devices such as switching devices, buses, current transformers, disconnectors, and voltage transformers, into a metal enclosure. The enclosure is hermetically closed after being filled with arc extinguishing gas such as sulfur hexafluoride ($SF_6$) having excellent insulating and arc extinguishing properties. As a circuit type for gas insulated switchgear, a bus connection type using a so-called 1-½-Circuit-Breaker (CB) configuration is sometimes used in the case where it is necessary to have high reliability in, for example, substations having a large capacity. According to this type of bus connections, three circuit breakers having unit configurations are connected together in series between two main buses. In other words, the three circuit breakers are used for drawing out two lines in consideration that the system should not be affected even if an accident has occurred in any of the buses and that the lines should not have to be stopped when the circuit breakers and the like need to be inspected.

As an example of a conventional technique that uses such a 1-½-CB method, a piece of gas insulated switchgear is disclosed in, for example, Patent Document 1. In the example disclosed in Patent Document 1, three partial units are arranged side by side. Each of the partial units is structured by horizontally drawing out a current transformer and a disconnector in the same direction from a lateral face of a vertical-type circuit breaker while arranging one above the other with an interval therebetween. With regard to any two partial units that are positioned adjacent to each other, the lower disconnector included in one of the two partial units is connected to the upper disconnector included in the other of the two partial units by using a diagonal bus, so that the three partial units are connected together in series.

As another example, Patent Document 2 discloses an arrangement in which three partial units are arranged side by side. Each of the partial units is structured by horizontally drawing out a current transformer and a disconnector in the same direction from a lateral face of a vertical-type circuit breaker while arranging one above the other with an interval therebetween. On the drawn-out side of the devices, two main buses are provided so as to extend at substantially the same level in a lower layer below the disconnectors.

Patent Document 1: Japanese Patent Application Laid-open No. H6-62513
Patent Document 2: Japanese Patent Application Laid-open No. 11-341627

DISCLOSURE OF INVENTION

Problem to be Solved by the Invention

In the gas insulated switchgear disclosed in Patent Document 1, however, it is necessary to use the diagonal bus to connect the partial units together. Thus, a problem arises where the required space increases, which leads to an increase in the costs. In addition, because of the bus (i.e., the diagonal bus) that connects the partial units together, it is difficult to reach the disconnectors, and the convenience during maintenance and inspection processes performed on the disconnectors is hampered. As a result, problems arise where it becomes necessary to secure an extra space for the maintenance and inspection processes and where the dimension between the partial units or the length of each of the partial units increases.

In the gas insulated switchgear disclosed in Patent Document 2, the two main buses are provided below the disconnectors so as to extend at substantially the same level. Thus, the convenience during maintenance and inspection processes performed on the disconnectors is hampered. As a result, problems arise where it becomes necessary to secure an extra space for the maintenance and inspection processes and where the dimension between the partial units or the length of each of the partial units increases.

As explained above, both of the conventional techniques have the problem where the installation space increases.

The present invention has been made in view of the above, and an object of the present invention is to provide gas insulated switchgear with which it is possible to secure the convenience during maintenance and inspection processes and to reduce the installation space.

Means for Solving Problem

To solve the problem described above and achieve the object, a gas insulated switchgear according to the present invention includes a plurality of integral units, in each of which a first partial unit, a second partial unit, and a third partial unit are connected in series in sequence while line-side devices are branched from a position between the first partial unit and the second partial unit and from a position between the second partial unit and the third partial unit, each of the first, the second, and the third partial units including: a circuit breaker of a vertical type having two branch outlets formed of upper and lower branch outlets that horizontally branch from a lateral face of the circuit breaker in a same direction; a current transformer and an upper disconnector that are connected in sequence to the upper branch outlet; and another current transformer and a lower disconnector that are connected in sequence to the lower branch outlet, one end of each of the integral units being connected to an upper main bus, whereas other end of each of the integral units being connected to a lower main bus, the upper and lower main buses being provided in an upper position and a lower position, respectively, wherein the first, the second, and the third partial units are arranged in an arranged direction side by side such that heights of the circuit breakers are equal to one another and that the two branch outlets therein are oriented in a same direction, the lower disconnector included in the second partial unit and the lower disconnector included in the first or the third partial unit are at a same height and are connected by a connection bus, whereas the upper disconnector included in the second partial unit and the upper disconnector included in the first or the third partial unit, which is not connected to the lower disconnector included in the second partial unit, are at a same height and are connected by a connection bus, the upper and lower disconnectors in each of the first, the second, and the third partial units are interposed between the upper and lower main buses extending in the arranging direction, the upper disconnector included in the first or the third partial unit that is connected to the lower disconnector included in the second partial unit is connected to the upper main bus via a T-shaped branch structure provided on the upper main bus, and the lower disconnector included in the first or the third partial unit that is connected to the upper disconnector included in the second partial unit is connected to the lower main bus via a T-shaped branch structure provided on the lower main bus.

Effect of the Invention

According to an aspect of the present invention, with regard to the plurality of integral units each of which includes the first partial unit, the second partial unit, and the third partial unit, the partial units are arranged side by side in such a manner that the height-direction positions of the circuit breakers included therein are equal to one another, while the two branch outlets included therein are all oriented in the same direction. Further, the line-side devices are provided so as to oppose the circuit breakers while the disconnectors are interposed therebetween. Thus, the devices are gathered on the front and the rear faces of the partial units. In other words, the circuit breakers are principally positioned on the front face side of the partial units, whereas the line-side devices are principally positioned on the rear face side of the partial units. As a result, it is possible to easily reach the devices including these elements, and the configuration naturally makes it possible to secure the space that is required by the maintenance and inspection processes. Consequently, there is no need to separately provide the space used for performing the maintenance and inspection processes on the devices. Thus, it is possible to reduce the installation space.

In addition, according to an aspect of the present invention, because the partial units are arranged side by side, it is possible to reduce the dimension between the partial units and the dimension in the lengthwise direction of the partial units. As a result, it is possible to integrate the layout of the entire electricity supply station in which the gas insulated switchgear is installed. An advantageous effect is therefore achieved where it is possible to save space easily.

Further, according to an aspect of the present invention, the vertical-type circuit breakers each having the two branch outlets that are provided while arranging one above the other with an interval therebetween are used, so that a current transformer and a disconnector are connected in series to each of the two branch outlets. Because of such a structure of each of the circuit breakers, there is no need to provide, on the inside of each of the circuit breakers, a folded structure of conductors or the like, and it is therefore possible to simplify the structure used for guiding the conductors. Thus, it is possible to reduce the diameter of the circuit breakers. As a result, it is possible to shorten the intervals between the units and to further reduce the installation space.

BRIEF DESCRIPTION OF DRAWINGS

FIG. 3 is a cross-sectional view of a device configuration including a partial unit (I) included in the gas insulated switchgear according to the first embodiment and is a cross-sectional view at the line A-A in FIG. 1.

FIG. 4 is a cross-sectional view of a device configuration including a partial unit (II) included in the gas insulated switchgear according to the first embodiment and is a cross-sectional view at the line B-B in FIG. 1.

FIG. 17 is a cross-sectional view of a device configuration including a partial unit (III) included in the gas insulated switchgear according to the third embodiment and is a cross-sectional view at the line C-C in FIG. 13.

Figure 1:
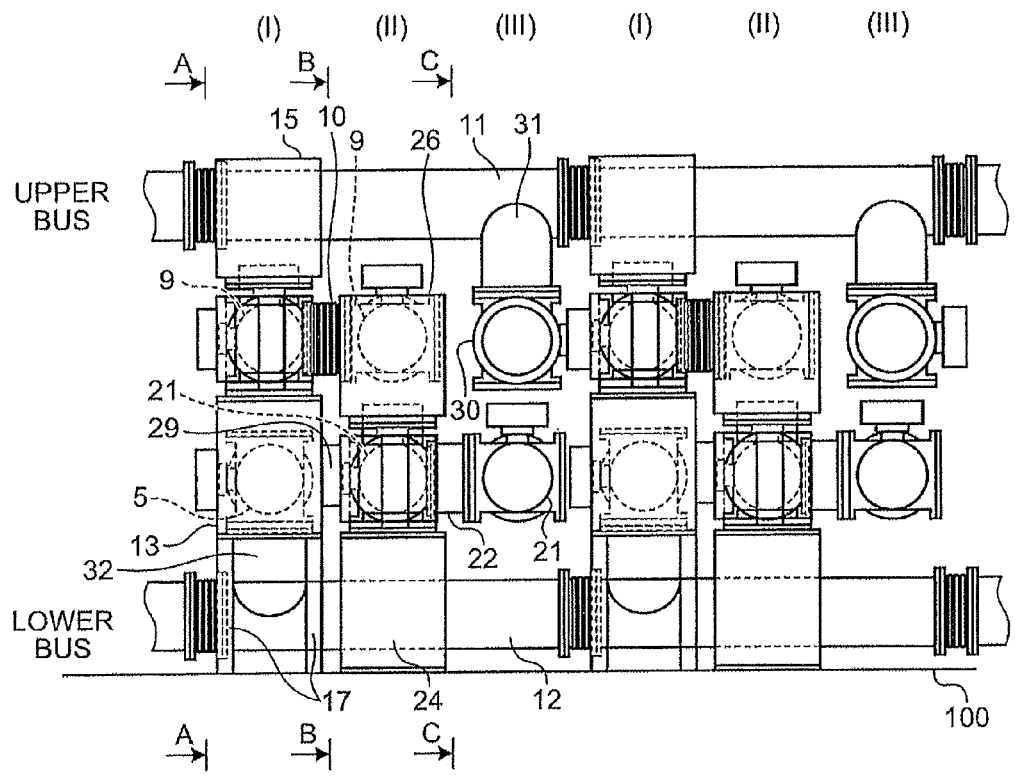
FIG. 1 is a front view of an example of a positional arrangement of 1-½-CB-type gas insulated switchgear according to a first embodiment of the present invention.

EXPLANATIONS OF LETTERS OR NUMERALS 1, 51, 71: Circuit breaker
2, 6, 18, 20, 23, 28, 29, 35, 43, 44: Operating device
52, 58, 62, 70, 72, 78, 82, 88, 89, 91, 92, 97: Operating device
3, 7, 53, 54, 74, 75: Branch outlet
4, 8, 55, 59, 76, 79: Current transformer
5, 9, 21, 30, 40, 41, 56, 60, 77, 80: Disconnector
10, 22, 42, 45, 61, 81: Connection bus
11, 63: Upper main bus
12, 64: Lower main bus
13, 24, 66, 84: Cable head
14, 25, 67, 85: Line-side disconnector
15, 26, 68, 86: Voltage transformer
16, 27, 69, 87: Earth switch
17, 36, 65, 73, 83: Supporting base
48, 49, 57, 98: Connection terminal
100: Installation surface

BEST MODE(S) FOR CARRYING OUT THE INVENTION

In the following sections, exemplary embodiments of gas insulated switchgear according to the present invention will be explained in detail, with reference to the accompanying drawings. The present invention is not limited to these exemplary embodiments.

First Embodiment

Figure 2:
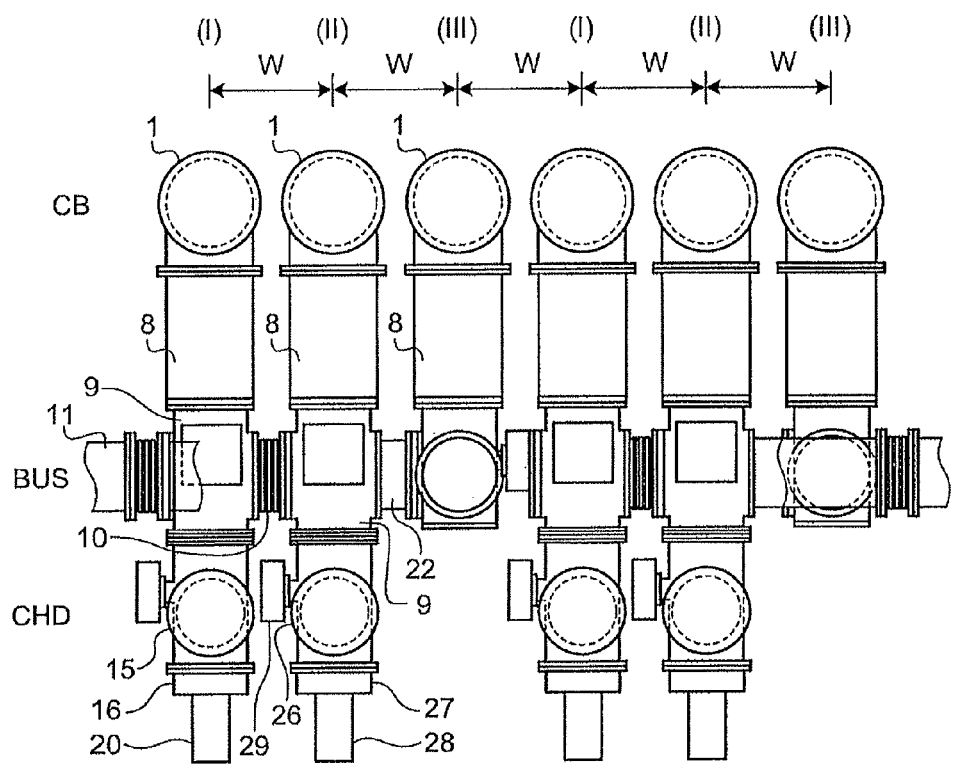
FIG. 2 is a top view corresponding to FIG. 1.
Figure 5:
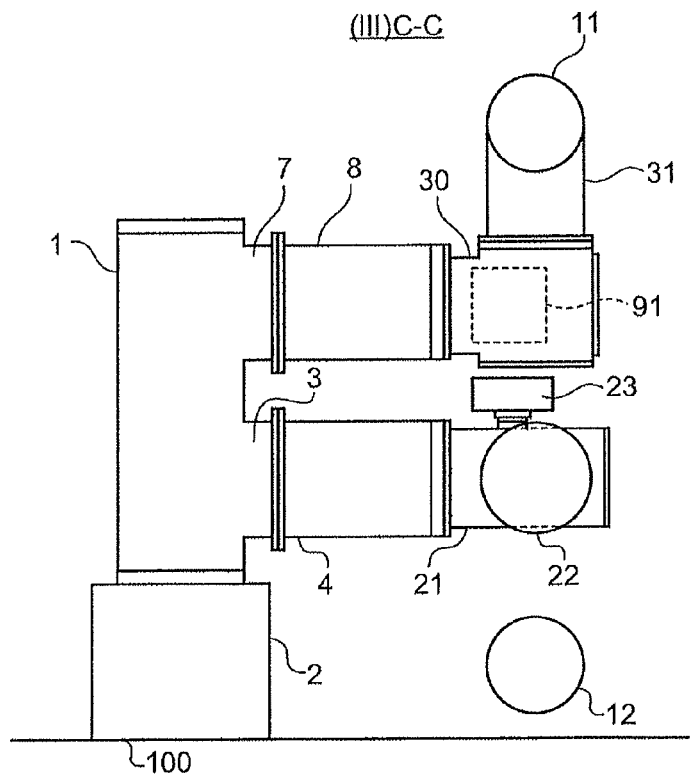
FIG. 5 is a cross-sectional view of a device configuration including a partial unit (III) included in the gas insulated switchgear according to the first embodiment and is a cross-sectional view at the line C-C in FIG. 1.
Figure 6:
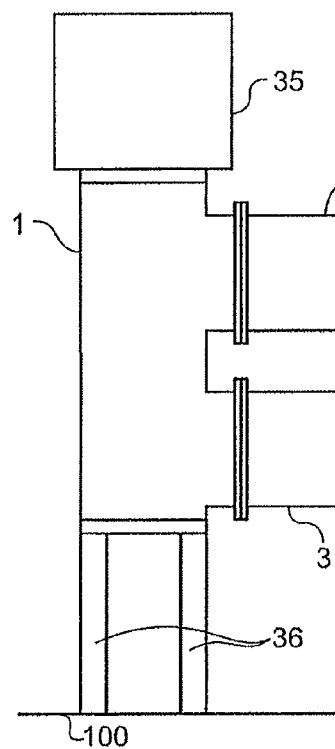
FIG. 6 is a cross-sectional view of another positional arrangement of a circuit breaker and an operating device therefor.
Figure 7:
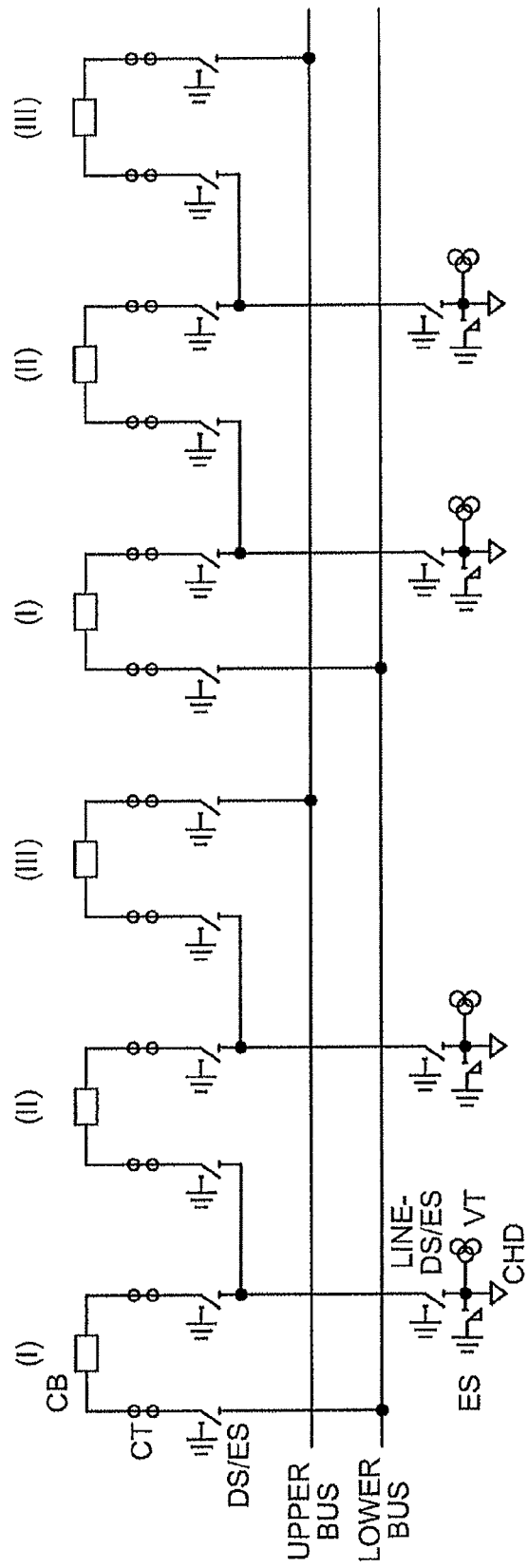
FIG. 7 is a single-line wiring diagram according to the first embodiment, a second embodiment, and a third embodiment of the present invention.

FIG. 1 is a front view of an example of a positional arrangement of 1-½-Circuit-Breaker(CB)-type gas insulated switchgear according to a first embodiment of the present invention. FIG. 2 is a top view corresponding to FIG. 1. FIG. 3 is a cross-sectional view of a device configuration including a partial unit (I) included in the gas insulated switchgear according to the first embodiment and is a cross-sectional view at the line A-A in FIG. 1. FIG. 4 is a cross-sectional view of a device configuration including a partial unit (II) included in the gas insulated switchgear according to the first embodiment and is a cross-sectional view at the line B-B in FIG. 1. FIG. 5 is a cross-sectional view of a device configuration including a partial unit (III) included in the gas insulated switchgear according to the first embodiment and is a cross-sectional view at the line C-C in FIG. 1. FIG. 6 is a cross-sectional view of another positional arrangement of a circuit breaker and an operating device therefor. FIG. 7 is a single-line wiring diagram according to the first embodiment.

The 1-½-CB-type gas insulated switchgear according to the first embodiment is configured so as to include a plurality of integral units. Each of the integral units is structured by connecting partial units (I), (II), and (III) together in series, while line-side devices are configured so as to branch from a connection line that connects the partial units (I) and (II) together and from a connection line that connects the partial units (II) and (III) together. Each of the partial units (I), (II), and (III) is structured by connecting a current transformer for instruments (hereinafter, "current transformer") and a disconnector with an earth switch in sequence to both sides of each circuit breaker. With regard to two main buses, one end of each of the integral units is connected to one of the two main buses, whereas the other end of each of the integral units is connected to the other of the two main buses.

The connection mode described above will be explained in detail, with reference to the single-line wiring diagram in FIG. 7. As shown in FIG. 7, each of the partial units (I) is configured so as to include a current transformer (CT) and a disconnector with an earth switch (DS/ES) on each of the two sides of the circuit breaker (CB). The same configuration applies to each of the partial units (II) and the partial units (III). The partial units (I), (II), and (III) are connected together in series in the stated order. A branch line is drawn from a connection line that connects the partial units (I) and (II) together and another branch line is drawn from a connection line that connects the partial units (II) and (III) together. Line-side devices including a line-side disconnector with an earth switch (LINE-DS/ES), a voltage transformer for instruments (hereinafter, "voltage transformer") (VT), an earth switch for a line-side earth (ES) and a cable head (CHD) are connected to each of the branch lines. An integral unit is structured with the partial units (I), (II), and (III) and the line-side devices that are connected so as to branch from the positions between the partial units. In the example shown in FIG. 7, two integral units are provided. The partial units (I) and (III) that are respectively positioned on the both ends of each of the integral units. Of the two disconnectors (DS/ES) included in the partial unit (I), the disconnector (DS/ES) that is not connected to the partial unit (II) is connected to a lower main bus, which is one of the two main buses. Of the two disconnectors (DS/ES) included in the partial unit (III), the disconnector (DS/ES) that is not connected to the partial unit (II) is connected to an upper main bus. In the description of the first embodiment, an example in which the number of integral units is two will be explained; however, the present invention is not limited to this example. The number of integral units may be three or more.

Next, configurations of the devices including configurations of the partial units (I), (II), and (III) will be explained in detail, with reference to FIGS. 3 to 5. After that, an overall layout will be explained, with reference to FIGS. 1 and 2.

First, a configuration of the devices including the partial unit (I) will be explained. As shown in FIG. 3, a circuit breaker 1 that is circular cylindrical shaped and has an operating device 2 therefor underneath is provided so as to stand in such a manner that the axial line thereof extends perpendicular to an installation surface 100. In other words, the circuit breaker 1 is a vertical-type circuit breaker. A circuit breaking unit (not shown) is provided on the inside of the circuit breaker 1, which is a space filled with insulating and arc extinguishing gas such as $SF_6$.

On a lateral face of the circuit breaker 1, two branch outlets are provided while arranging one above the other with an interval therebetween, the two branch outlets namely being a branch outlet 3 provided in a lower position and a branch outlet 7 provided in an upper position. The branch outlets 3 and 7 are horizontally drawn out so as to branch from the lateral face of the circuit breaker 1 in the same direction.

A current transformer 4 and a disconnector 5 with an earth switch are connected to the branch outlet 3 in series in the stated order. An operating device 6 for operating the disconnector 5 is provided on a lateral face of the disconnector 5. A lower main bus 12, which is the lower one of two main buses that extend along each other while arranging one above the other with an interval therebetween, is provided below the disconnector 5. The disconnector 5 is connected to the lower main bus 12 via a branch portion 32. The branch portion 32 is a T-shaped branch structure that branches from the lower main bus 12.

A current transformer 8 and a disconnector 9 with an earth switch are connected to the branch outlet 7 in series in the stated order. A connection bus 10 extending in a direction that is orthogonal to the circuit breaker 1 and the current transformers 4 and 8 is connected to the disconnector 9. The connection bus 10 connects together the partial unit (I) and the partial unit (II), which is positioned adjacent to the partial unit (I). An operating device 18 for operating the disconnector 9 is provided on top of the disconnector 9.

An upper main bus 11, which is the upper one of the two main buses described above, is provided above the disconnector 9. The upper main bus 10 and the lower main bus 12 are provided so as to extend horizontally and parallel to each other. The direction in which the connection bus 11 extends is the same as the direction in which the upper main bus 11 and the lower main bus 12 extend.

Opposing the circuit breaker 1 while the disconnectors 5 and 9 are interposed therebetween, a cable head 13 is provided on a supporting base 17, a line-side disconnector 14 with an earth switch is connected on top of the cable head 13, an operating device 19 for the line-side disconnector 14 is provided on a lateral face of the line-side disconnector 14, and a voltage transformer 15 is provided on top of the line-side disconnector 14. Also, while being connected to the line-side disconnector 14, an earth switch 16 for a line-side earth is provided on another lateral face of the line-side disconnector 14 that is positioned on the opposite side from the circuit breaker 1. In addition, an operating device 20 for operating the earth switch 16 is provided. Further, the line-side disconnector 14 is connected to the disconnector 9, which is connected to the circuit breaker 1. The portion of the disconnector 9 connected to the disconnector 14 is positioned on the opposite side from the current transformer 8 so as to oppose the connection portion at which the disconnector 9 is connected to the current transformer 8. In other words, the disconnector 9 has a T-shaped branch structure in which a branch portion to which the current transformer 8 is connected and another branch portion to which the line-side disconnector 14 is connected are positioned so as to oppose each other, while the connection bus 10 is connected to the other branch portion that is orthogonal to these opposing branches.

A path that extends from the disconnector 9 to the cable head 13 changes direction by 90 degrees at the line-side disconnector 14, so that the path substantially forms an L shape. In other words, the line-side disconnector 14 is horizontally connected to the disconnector 9, while the cable head 13 is connected underneath the line-side disconnector 14 so as to extend downward. Thus, the path that extends from the disconnector 9 to the cable head 13 looks like an L that is inverted in the right-and-left direction and rotated counterclockwise by 90 degrees.

As explained above, the partial unit (I) includes the vertical-type circuit breaker 1 provided with the branch outlets 3 and 7, the current transformers 4 and 8, and the disconnectors 5 and 9 each provided with an earth switch. Further, the line-side devices such as the cable head 13, the line-side disconnector 14, and the voltage transformer 15 are connected so as to oppose the circuit breaker 1 while the disconnectors 5 and 9 are interposed therebetween.

Next, configurations of the devices including the partial unit (II) will be explained. Some of the constituent elements that are the same as those in the partial unit (I) will be referred to by using the same reference characters. As shown in FIG. 4, the positional arrangement of the vertical-type circuit breaker 1, the operating device 2 for the circuit breaker 1, the branch outlets 3 and 7 provided on a lateral face of the circuit breaker 1, the current transformer 4 connected to the branch outlet 3, and the current transformer 8 connected to the branch outlet 7 is the same as that in the partial unit (I).

A disconnector 21 with an earth switch is connected to the current transformer 4. In other words, the current transformer 4 and the disconnector 21 with an earth switch are connected to the circuit breaker 1 in series via the branch outlet 3 in sequence. An operating device 23 for operating the disconnector 21 is provided on top of the disconnector 21. Further, a connection bus 22 is connected to the disconnector 21 while extending in a direction that is orthogonal to the circuit breaker 1 and the current transformers 4 and 8. The connection bus 22 connects the partial unit (II) and the partial unit (III) together.

A disconnector 9 with an earth switch is connected to the current transformer 8. In other words, like in the partial unit (I), the current transformer 8 and the disconnector 9 with an earth switch are connected to the circuit breaker 1 in series via the branch outlet 7 in sequence. The operating device 18 is provided on top of the disconnector 9. Further, as described above, the connection bus 10 that connects the partial unit (I) and the partial unit (II) together is connected to the disconnector 9.

The upper main bus 11 is positioned above the disconnector 9, whereas the lower main bus 12 is positioned below the disconnector 21. The connection bus 22 extends parallel to the upper main bus 11 and to the lower main bus 12. The connection bus 22 and the connection bus 10 extend in opposite directions.

Opposing the circuit breaker 1 while the disconnectors 9 and 21 each provided with an earth switch are interposed therebetween, a cable head 24 is provided on the installation surface 100, a line-side disconnector 25 with an earth switch is connected on top of the cable head 24, an operating device 29 for the line-side disconnector 25 is provided on a lateral face of the line-side disconnector 25, and a voltage transformer 26 is provided on top of the line-side disconnector 25. Also, while being connected to the line-side disconnector 25, an earth switch 27 for a line-side earth is provided on another lateral face of the line-side disconnector 25 that is positioned on the opposite side from the circuit breaker 1. In addition, an operating device 28 for operating the earth switch 27 is provided. Further, the line-side disconnector 25 is connected to the disconnector 21, which is connected to the circuit breaker 1. The portion of the disconnector 21 connected to the disconnector 25 is positioned on the opposite side from the current transformer 4 so as to oppose the connection portion at which the disconnector 21 is connected to the current transformer 4. In other words, the disconnector 21 has a T-shaped branch structure in which a branch portion to which the current transformer 4 is connected and another branch portion to which the line-side disconnector 25 is connected are positioned so as to oppose each other, while the connection bus 22 is connected to the branch portion that is orthogonal to these opposing branches. As explained, the disconnector 21 branches in the shape of a T on a horizontal plane, which is positioned parallel to the installation surface 100.

A path that extends from the disconnector 21 to the cable head 24 changes direction by 90 degrees at the line-side disconnector 25, so that the path substantially forms an L shape. In other words, the line-side disconnector 25 is horizontally connected to the disconnector 21, while the cable head 24 is connected underneath the line-side disconnector 25 so as to extend downward. Thus, the path that extends from the disconnector 21 to the cable head 24 looks like an L that is inverted in the right-and-left direction and rotated counterclockwise by 90 degrees.

As explained above, the partial unit (II) includes the vertical-type circuit breaker 1 provided with the branch outlets 3 and 7, the current transformers 4 and 8, and the disconnectors 21 and 9 each provided with an earth switch. Further, the line-side devices such as the cable head 24, the line-side disconnector 25, and the voltage transformer 26 are connected so as to oppose the circuit breaker 1 while the disconnectors 21 and 9 are interposed therebetween.

Next, configurations of the devices including the partial unit (III) will be explained. Some of the constituent elements that are the same as those in the partial units (I) and (II) will be referred to by using the same reference characters. As shown in FIG. 5, the positional arrangement of the vertical-type circuit breaker 1, the operating device 2 for the circuit breaker 1, the branch outlets 3 and 7 provided on a lateral face of the circuit breaker 1, the current transformer 4 connected to the branch outlet 3, and the current transformer 8 connected to the branch outlet 7 is the same as that in the partial units (I) and (II).

The disconnector 21 with an earth switch is connected to the current transformer 4. In other words, like in the partial unit (II), the current transformer 4 and the disconnector 21 with an earth switch are connected to the circuit breaker 1 in series via the branch outlet 3 in sequence. The operating device 23 for operating the disconnector 21 is provided on top of the disconnector 21. Further, the connection bus 22 is connected to the disconnector 21 while extending in a direction that is orthogonal to the circuit breaker 1 and the current transformers 4 and 8. As described above, the connection bus 22 connects the partial unit (II) and the partial unit (III) together.

The current transformer 8 and a disconnector 30 with an earth switch are connected, in series and in sequence, to the branch outlet 7, which is the upper branch outlet provided on the circuit breaker 1. The upper main bus 11 is positioned above the disconnector 30, whereas the lower main bus 12 is positioned below the disconnector 21. An operating device 91 for operating the disconnector 30 is provided on a lateral face of the disconnector 30. The disconnector 30 is connected to the upper main bus 11 via a branch portion 31. The branch portion 31 is a branch portion having a T-shaped branch structure that branches from the upper main bus 11. It should be noted that no line-side devices are provided so as to oppose the partial unit (III).

Next, a layout according to the first embodiment will be explained in detail, with reference to FIGS. 1 and 2. As shown in FIGS. 1 and 2, in the 1-½-CB-type gas insulated switchgear according to the first embodiment, for example, two integral units are arranged side by side. Each of the integral units includes the partial unit (I), the partial unit (II), and the partial unit (III). Further, throughout both of the two integral units, the intervals between two partial units are configured so as to be regular intervals each of which can be expressed as W. In the example shown in FIGS. 1 and 2, the partial units are arranged in the following order from the left-hand side to the right-hand side of the drawings: the partial unit (I), the partial unit (II), and the partial unit (III); however, needless to say, it is possible to arrange the partial units in the reverse order.

The partial units (I), (II), and (III) are arranged so as to be parallel to one another in such a manner that the branch outlets 3 and 7 of the circuit breakers 1 are all oriented in the same direction and that the height-direction positions of the circuit breakers 1 are equal to one another. The direction in which the partial units (I), (II), and (III) are arranged is a direction that is orthogonal to the branching direction of the branch outlets 3 and 7, i.e., a direction that is orthogonal to the circuit breaker 1 and the current transformers 4 and 8. In other words, the circuit breakers 1 and the current transformers 4 and 8 included in the partial units are arranged side by side so as to be parallel to one another. Accordingly, between the two integral units, the height-direction positions of the upper disconnectors connected to the respective circuit breakers 1 are equal to one another. Similarly, between the two integral units, the height-direction positions of the lower disconnectors connected to the respective circuit breakers 1 are equal to one another.

In the following sections, to explain the mode of connection used for connecting the partial units together, the connections between the partial units will be explained from the left-hand side to the right-hand side of the drawings, while referring to FIGS. 1 and 2. First, the partial unit (I) is connected to the partial unit (II) that is positioned adjacent to the partial unit (I) by the connection bus 10. More specifically, the disconnector 9 included in the partial unit (I) is connected to the disconnector 9 included in the partial unit (II) by the connection bus 10. As explained above, each of the disconnectors 9 is a disconnector that is connected to the upper branch outlet 7 of the corresponding one of the circuit breakers 1. Accordingly, by connecting the upper disconnectors 9 to each other with the connection bus 10, the partial unit (I) is connected to the partial unit (II), which is positioned adjacent to the partial unit (I).

Further, the partial unit (II) is connected to the partial unit (III), which is positioned adjacent to the partial unit (II) on the right-hand side thereof, by the connection bus 22. More specifically, the disconnector 21 included in the partial unit (II) is connected to the disconnector 21 included in the partial unit (III) by the connection bus 22. As explained above, each of the disconnectors 21 is a disconnector that is connected to the lower branch outlet 3 of the corresponding one of the circuit breakers 1. Accordingly, by connecting the lower disconnectors 21 to each other with the connection bus 22, the partial unit (II) is connected to the partial unit (III), which is positioned adjacent to the partial unit (II) on the right-hand side thereof.

The mode of connection between the partial units described above is applied both of the integral units. In other words, the connection bus 10 that connects the upper disconnectors 9 to each other is used for the connection between the partial unit (I) and the partial unit (II). The connection bus 22 that connects the lower disconnectors 21 to each other is used for the connection between the partial unit (II) and the partial unit (III). The connection buses 10 and the connection buses 22 are arranged alternately along the direction in which the partial units are arranged. The connection buses 10 are provided in positions that are higher than the positions in which the connection buses 22 are provided. In other words, the connection buses are provided alternately between an upper position and a lower position along the direction in which the partial units are arranged. As a result, the positions of the bus paths connecting the partial units to one another also change between the upper positions and the lower positions.

The upper main bus 11 and the lower main bus 12 are provided so as to extend in the direction in which the partial units are arranged side by side, while the disconnectors 5, 9, 21, and 30 are interposed therebetween. The disconnector 5 included in the partial unit (I), which is positioned on the left-hand-side end of each of the integral units, is connected to the lower main bus 12 via the branch portion 32 that branches from the lower main bus 12 in the shape of a T. Further, the disconnector 30 included in the partial unit (III), which is positioned on the right-hand-side end of each of the integral units, is connected to the upper main bus 11 via the branch portion 31 that branches from the upper main bus 11 in the shape of a T. By using the T-shaped branch structures of the disconnectors 5 and 30, the height levels of the branch portions to the line-side devices are configured so as to be different from the height levels of the main bus connection portions. As a result, it is possible to arrange the two main buses linearly.

With regard to the partial unit (I), the line-side devices are provided so as to oppose the circuit breaker 1 while the disconnectors 5 and 9 are interposed therebetween. The same positional arrangement also applies to the partial unit (II). Accordingly, due to the 1-½-CB-type configuration, no line-side devices are provided for the partial unit (III). In other words, one set of line-side devices is connected to each of the disconnectors included in two of the partial units (I), (II), and (III), while opposing the current-transformer-side connection face. Further, throughout the plurality of integral units, the partial units to which no line-side devices are connected are arranged at regular intervals in the direction in which the partial units are arranged. For example, in the example shown in FIG. 2, no line-side devices are connected to the partial units (III) in both of the two integral units.

According to the first embodiment, with regard to the plurality of integral units each of which includes the partial units (I), (II), and (III), the two branch outlets 3 and 7 of the circuit breakers 1 included in the partial units are all oriented in the same direction, while the partial units are linearly arranged in the direction that is orthogonal to the orientation direction. Further, the line-side devices are provided so as to oppose the circuit breakers 1 while the disconnectors are interposed therebetween. Thus, the devices are gathered on the front and the rear faces of the partial units. In other words, the circuit breakers 1 are principally positioned on the front face side of the partial units, whereas the line-side devices are principally positioned on the rear face side of the partial units. As a result, it is possible to easily reach the devices including these elements, and the configuration naturally makes it possible to secure the space that is required by the maintenance and inspection processes. For example, in FIG. 2, there is no need to provide the space used for performing maintenance and inspection processes on the circuit breaker 1 and the earth switches 16 and 27. It is possible to easily reach the operating devices for operating these devices. As explained, according to the first embodiment, because the devices are gathered on the front and the rear faces of the partial units, there is no need to provide another space used for performing the maintenance and inspection processes on the devices. Thus, it is possible to reduce the installation space.

In addition, according to the first embodiment, because the partial units are arranged side by side, it is possible to reduce the dimension between the partial units and the dimension in the lengthwise direction of the partial units. As a result, it is possible to integrate the layout of the entire electricity supply station in which the gas insulated switchgear is installed. An advantageous effect is therefore achieved where it is possible to save space easily. This arrangement is effective especially when cable connections are used on the line side.

Further, according to the first embodiment, the vertical-type circuit breakers 1 each having the two branch outlets 3 and 7 that are provided one above the other with an interval therebetween are used, so that a current transformer and a disconnector are connected in series to each of the two branch outlets. Because of such a structure of each of the circuit breakers 1, there is no need to provide, on the inside of each of the circuit breakers 1, a folded structure of conductors or the like, and it is therefore possible to simplify the structure used for guiding the conductors. Thus, it is possible to reduce the diameter of the circuit breakers. As a result, it is possible to shorten the intervals between the units and to further reduce the installation space.

In addition, according to the first embodiment, the circuit breakers 1 are positioned in the lower layer. Thus, it is possible to greatly reduce the number of supporting bases. As a result, it is possible to reduce the costs and to improve quake-resistant properties. Alternatively, it is also acceptable to use a positional arrangement of the circuit breakers 1 as shown in FIG. 6. More specifically, in the example shown in FIG. 6, an operating device 35 for the circuit breaker 1 is provided on top of the circuit breaker 1, and the circuit breaker 1 is supported by a supporting base 36. It should be noted, however, that the height of the supporting base 36 is adjusted in such a manner that the height-direction positions of the branch outlets 3 and 7 shown in FIG. 6 are the same as the height-direction positions of the branch outlets 3 and 7 shown in FIGS. 3 to 5.

Further, according to the first embodiment, each of the disconnectors 5, 9, 21, and 30 has the T-shaped branch structure. As a result, it is possible to reduce the number of tanks and spacers used for connecting the devices to one another. Thus, it is possible not only to reduce the installation space, but also to reduce the costs.

Furthermore, according to the first embodiment, one set of line-side devices is connected to each of the partial units. As a result, it is possible to reduce the dimension in the lengthwise direction of the partial units. Thus, it is possible to shorten the total length of the entire electricity supply station. Alternatively, another arrangement is also acceptable in which, for example, two sets of line-side devices are connected to one partial unit. As yet another arrangement, it is also acceptable to position the line-side devices between the partial units, by folding the structure back to the circuit breaker 1 side. This arrangement is suitable in a situation where the size of the line-side devices is large.

According to the first embodiment, one set of line-side devices is connected to each of two of the partial units (I), (II), and (III). Further, throughout the plurality of integral units, the partial units to which no line-side devices are connected are arranged at regular intervals in the direction in which the partial units are arranged. In the example shown in FIG. 2, no line-side devices are connected to the partial units (III) in both of the two integral units. With this arrangement, because no line-side devices are connected to the partial units (III), an empty space is formed in the lengthwise direction of each of the partial units (III). By utilizing these empty spaces (e.g., by providing, in an integrated manner, an operation box that also functions for the adjacent partial units), it is possible to easily perform the maintenance and inspection processes not only on the disconnectors 21 and 30 included in the partial unit (III), but also on the disconnectors 5 and 9 included in the adjacent partial unit (I) and the disconnectors 9 and 21 included in the adjacent partial unit (II) on the opposite side. If such empty spaces were not positioned at regular intervals in the direction in which the partial units are arranged, there would be some disconnectors that are difficult to reach, and the convenience during the maintenance and inspection processes would be hampered. As explained, because the partial units (I), (II), and (III) and the line-side devices are arranged with high density, there is no need to provide a space dedicated to the maintenance and inspection processes. Thus, it is possible to shorten, in particular, the intervals between the partial units.

According to the first embodiment, for example, the path that extends from the disconnector 9 to the cable head 13 changes direction by 90 degrees at the line-side disconnector 14, so that the path substantially forms an L shape. As a result, it is possible to reduce the dimension in the lengthwise direction of the partial units and to shorten the total length of the electricity supply station.

In addition, according to the first embodiment, throughout the plurality of integral units, all the partial units are arranged at the regular intervals. As a result, it is possible to reduce the dimension between the units and to shorten the width of the electricity supply station.

Further, as shown in FIG. 1, the disconnectors 5 and 30 that are positioned on the two ends of each of the integral units are connected to the lower main bus 12 and the upper main bus 11 via the branch portions 32 and 31, respectively. Thus, when it is necessary to additionally provide another integral unit, connections can be made to the end portions of the upper main bus 11 and the lower main bus 12. Thus, it is possible to provide additional integral units easily.

In the sections above, the example of a three-phase system has been explained; however, the present invention is not limited to this example. It is possible to apply the present invention likewise to an isolated phase system.

Second Embodiment

Figure 8:
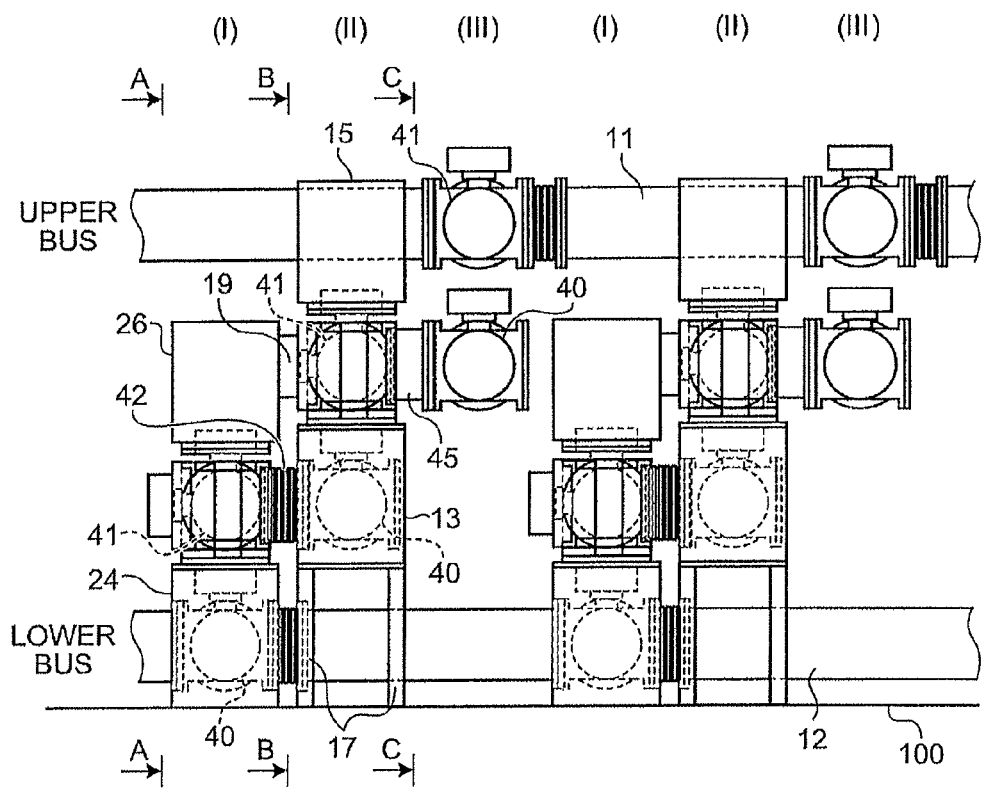
FIG. 8 is a front view of an example of a positional arrangement of 1-½-CB-type gas insulated switchgear according to the second embodiment.
Figure 9:
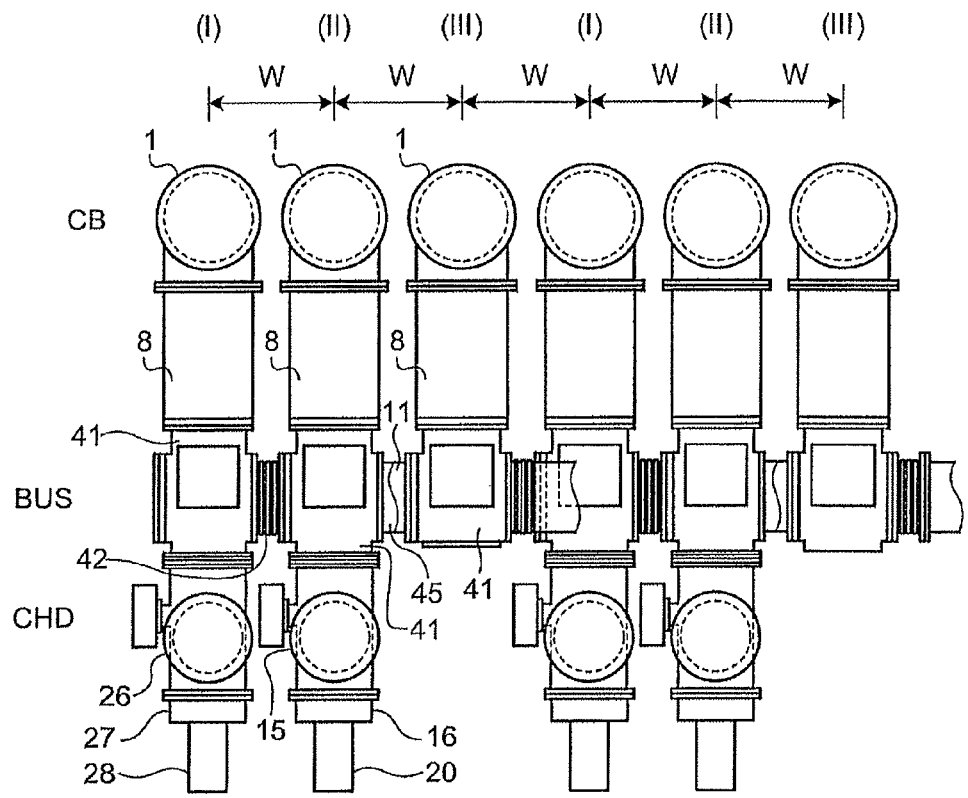
FIG. 9 is a top view corresponding to FIG. 8.
Figure 10:
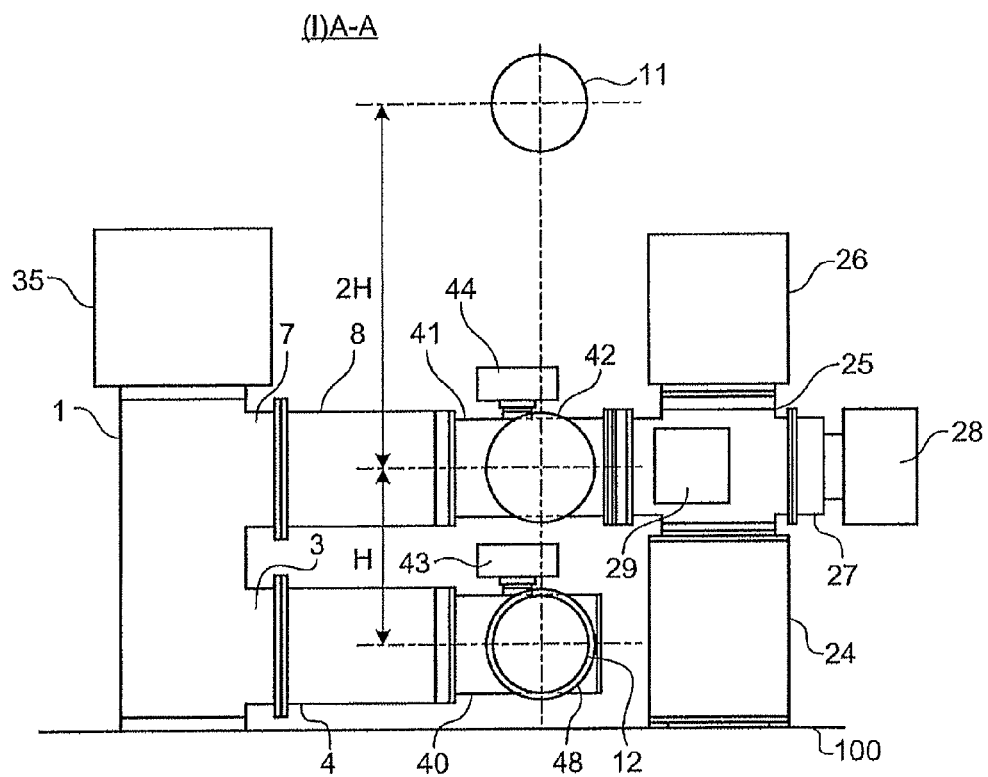
FIG. 10 is a cross-sectional view of a device configuration including a partial unit (I) included in the gas insulated switchgear according to the second embodiment and is a cross-sectional view at the line A-A in FIG. 8.
Figure 11:
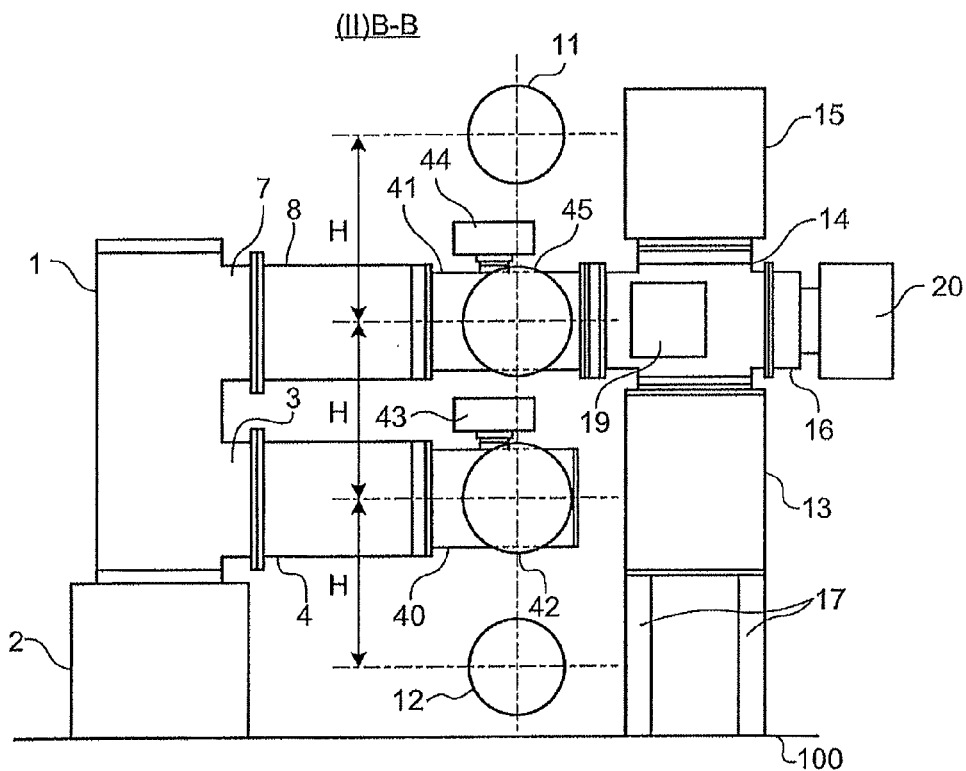
FIG. 11 is a cross-sectional view of a device configuration including a partial unit (II) included in the gas insulated switchgear according to the second embodiment and is a cross-sectional view at the line B-B in FIG. 8.
Figure 12:
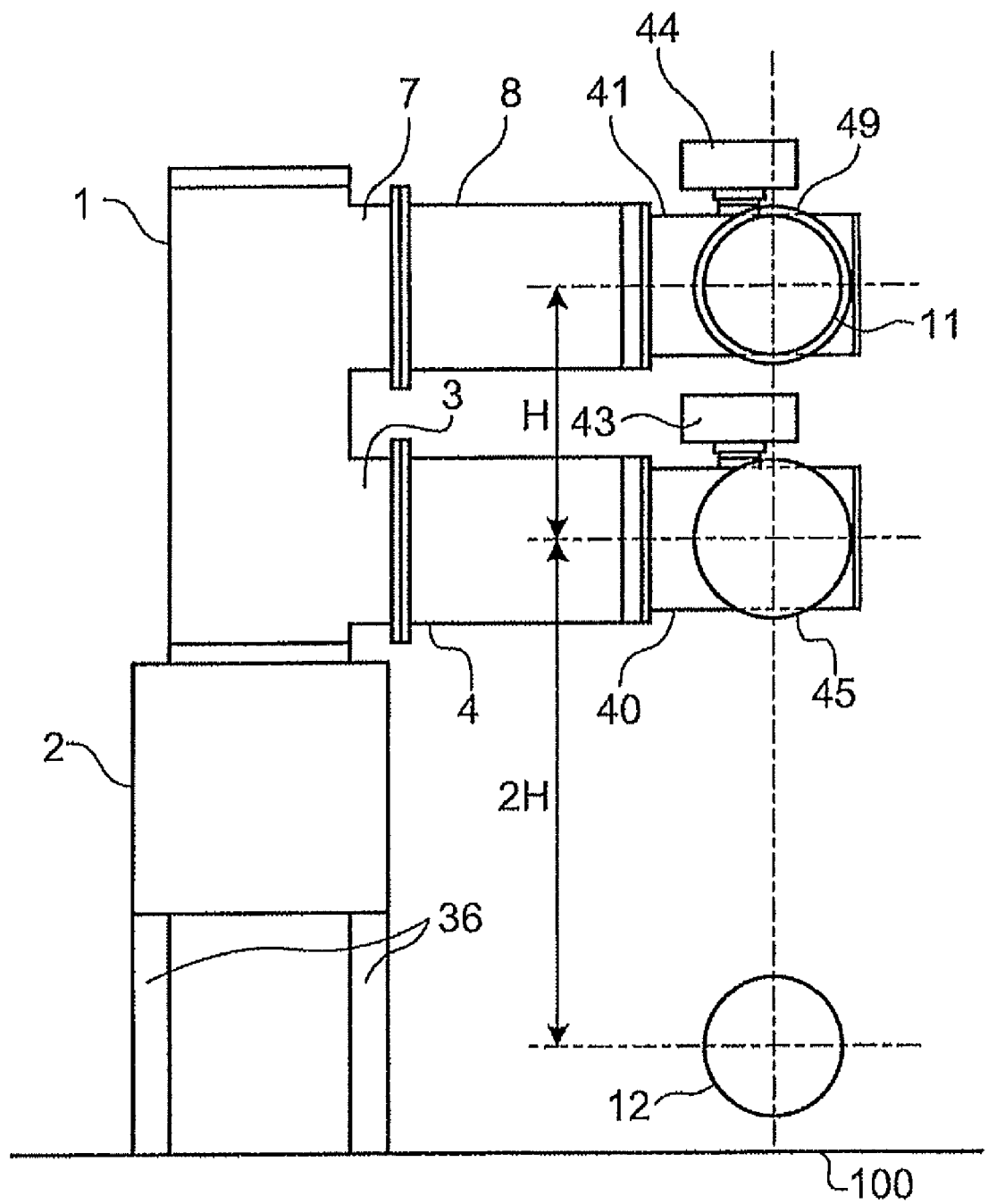
FIG. 12 is a cross-sectional view of a device configuration including a partial unit (III) included in the gas insulated switchgear according to the second embodiment and is a cross-sectional view at the line C-C in FIG. 8.

FIG. 8 is a front view of an example of a positional arrangement of 1-½-CB-type gas insulated switchgear according to a second embodiment of the present invention. FIG. 9 is a top view corresponding to FIG. 8. FIG. 10 is a cross-sectional view of a device configuration including a partial unit (I) included in the gas insulated switchgear according to the second embodiment and is a cross-sectional view at the line A-A in FIG. 8. FIG. 11 is a cross-sectional view of a device configuration including a partial unit (II) included in the gas insulated switchgear according to the second embodiment and is a cross-sectional view at the line B-B in FIG. 8. FIG. 12 is a cross-sectional view of a device configuration including a partial unit (III) included in the gas insulated switchgear according to the second embodiment and is a cross-sectional view at the line C-C in FIG. 8.

The 1-½-CB-type gas insulated switchgear according to the second embodiment is configured so as to include a plurality of integral units. Each of the integral units is structured by connecting partial units (I), (II), and (III) together in series, while line-side devices are configured so as to branch from a connection line that connects the partial units (I) and (II) together and from a connection line that connects the partial units (II) and (III) together. Each of the partial units (I), (II), and (III) is structured by connecting a current transformer and a disconnector with an earth switch in sequence to each of the two sides of a circuit breaker With regard to two main buses, one end of each of the integral units is connected to one of two main buses, whereas the other end of each of the integral units is connected to the other of the two main buses. Because the single-line wiring diagram according to the second embodiment is the same as the one shown in FIG. 7, the explanation thereof will be omitted.

Next, configurations of the devices including the configurations of the partial units (I), (II), and (III) will be explained in detail, with reference to FIGS. 10 to 12. After that, an overall layout will be explained, with reference to FIGS. 8 and 9.

First, a configuration of the devices including the partial unit (I) will be explained. As shown in FIG. 10, the circuit breaker 1 that has a circular cylindrical shape and has the operating device 35 therefor on top is provided so as to stand in such a manner that the axial line thereof extends perpendicular to the installation surface 100. In other words, the circuit breaker 1 is a vertical-type circuit breaker. A circuit breaking unit (not shown) is provided on the inside of the circuit breaker 1, which is a space filled with insulating and arc extinguishing gas such as $SF_6$.

On a lateral face of the circuit breaker 1, two branch outlets are provided while arranging one above the other with an interval H therebetween, the two branch outlets namely being the branch outlet 3 provided in a lower position and the branch outlet 7 provided in an upper position. The branch outlets 3 and 7 are horizontally drawn out so as to branch from the lateral face of the circuit breaker 1 in the same direction.

The current transformer 4 and a disconnector 40 with an earth switch are connected to the branch outlet 3 in series in the stated order. An operating device 43 for operating the disconnector 40 is provided on top of the disconnector 40. The lower main bus 12, which is the lower one of two main buses that extend along each other while arranged one above the other with interval 3H therebetween, is connected to the disconnector 40 via a connection terminal 48 provided for the connector 40.

The current transformer 8 and a disconnector 41 with an earth switch are connected to the branch outlet 7 in series in the stated order. A connection bus 42 extending in a direction that is orthogonal to the circuit breaker 1 and the current transformers 4 and 8 is connected to the disconnector 41. The connection bus 42 connects together the partial unit (I) and the partial unit (II), which is positioned adjacent to the partial unit (I). An operating device 44 for operating the disconnector 41 is provided on top of the disconnector 41.

The upper main bus 11, which is the upper one of the two main buses described above, is provided above the disconnector 41. The upper main bus 11 and the lower main bus 12 are provided so as to extend horizontally and parallel to each other. The direction in which the connection bus 42 extends is the same as the direction in which the upper main bus 11 and the lower main bus 12 extend. As described above, the distance between the upper main bus 11 and the lower main bus 12 can be expressed as 3H, whereas the distance between the connection bus 42 and the lower main bus 12 can be expressed as H. Accordingly, the distance between the connection bus 42 and the upper main bus 11 can be expressed as 2H.

Opposing the circuit breaker 1 while the disconnectors 40 and 41 are interposed therebetween, the cable head 24 is provided on the installation surface 100, the line-side disconnector 25 with an earth switch is connected on top of the cable head 24, the operating device 29 for the line-side disconnector 25 is provided on a lateral face of the line-side disconnector 25, and the voltage transformer 26 is provided on top of the line-side disconnector 25. Also, while being connected to the line-side disconnector 25, the earth switch 27 for a line-side earth is provided on another lateral face of the line-side disconnector 25 that is positioned on the opposite side from the circuit breaker 1. In addition, the operating device 28 for operating the earth switch 27 is provided. Further, the line-side disconnector 25 is connected to the disconnector 41, which is connected to the circuit breaker 1. The portion of the disconnector 41 connected to the line-side disconnector 25 is positioned on the opposite side from the current transformer 8 so as to oppose the connection portion at which the disconnector 41 is connected to the current transformer 8. In other words, the disconnector 41 has a T-shaped branch structure in which a branch portion to which the current transformer 8 is connected and another branch portion to which the line-side disconnector 25 is connected are positioned so as to oppose each other, while the connection bus 42 is connected to the other branch portion that is orthogonal to these opposing branches. As explained here, the disconnector 41 branches in the shape of a T on a horizontal plane, which is positioned parallel to the installation surface 100.

A path that extends from the disconnector 41 to the cable head 24 changes direction by 90 degrees at the line-side disconnector 25, so that the path substantially forms an L shape.

As explained above, the partial unit (I) includes the vertical-type circuit breaker 1 provided with the branch outlets 3 and 7, the current transformers 4 and 8, and the disconnectors 40 and 41 each provided with an earth switch. Further, the line-side devices such as the cable head 24, the line-side disconnector 25, and the voltage transformer 26 are connected so as to oppose the circuit breaker 1 while the disconnectors 40 and 41 are interposed therebetween.

Next, configurations of the devices including the partial unit (II) will be explained. Some of the constituent elements that are the same as those in the partial unit (I) will be referred to by using the same reference characters. As shown in FIG. 11, the circuit breaker 1 that has a circular cylindrical shape and has the operating device 2 therefor underneath is provided so as to stand in such a manner that the axial line thereof extends perpendicular to the installation surface 100. Like in the partial unit (I), to the vertical-type circuit breaker 1, the branch outlets 3 and 7 having an interval H therebetween, the current transformer 4 and the disconnector 40 with an earth switch that are connected in series to the branch outlet 3 in sequence, and the current transformer 8 and the disconnector 41 with an earth switch that are connected in series to the branch outlet 7 in sequence are connected.

The connection bus 42 is connected to the disconnector 40 while extending in a direction that is orthogonal to the circuit breaker 1 and the current transformers 4 and 8. As explained above, the connection bus 42 connects the partial unit (II) and the partial unit (I) together. The operating device 43 for operating the disconnector 40 is provided on top of the disconnector 40.

A connection bus 45 is connected to the disconnector 41 while extending in a direction that is orthogonal to the circuit breaker 1 and the current transformers 4 and 8. The connection bus 45 connects the partial unit (II) and the partial unit (III) together. The connection bus 45 extends in a direction opposite from the direction in which the connection bus 42 extends. The operating device 44 for operating the disconnector 41 is provided on top of the disconnector 41.

The upper main bus 11 is positioned above the disconnector 41 while having an interval H therebetween, whereas the lower main bus 12 is positioned below the disconnector 40 while having an interval H therebetween. The connection buses 42 and 45 extend parallel to the upper main bus 11 and the lower main bus 12.

Opposing the circuit breaker 1 while the disconnectors 40 and 41 each provided with an earth switch are interposed therebetween, the cable head 13 is provided on the supporting base 17, the line-side disconnector 14 with an earth switch is connected on top of the cable head 13, the operating device 19 for the line-side disconnector 14 is provided on a lateral face of the line-side disconnector 14, and the voltage transformer 15 is provided on top of the line-side disconnector 14. Also, while being connected to the line-side disconnector 14, the earth switch 16 for a line-side earth is provided on another lateral face of the line-side disconnector 14 that is positioned on the opposite side from the circuit breaker 1. In addition, the operating device 20 for operating the earth switch 16 is provided. Further, the line-side disconnector 14 is connected to the disconnector 41, which is connected to the circuit breaker 1. The portion of the disconnector 41 connected to the disconnector 14 is positioned on the opposite side from the current transformer 8 so as to oppose the connection portion at which the disconnector 41 is connected to the current transformer 8. In other words, the disconnector 41 has a T-shaped branch structure in which a branch portion to which the current transformer 8 is connected and another branch portion to which the line-side disconnector 14 is connected are positioned so as to oppose each other, while the connection bus 45 is connected to the other branch portion that is orthogonal to these opposing branches. As explained here, the disconnector 41 branches in the shape of a T on a horizontal plane, which is positioned parallel to the installation surface 100.

A path that extends from the disconnector 41 to the cable head 13 changes direction by 90 degrees at the line-side disconnector 14, so that the path substantially forms an L shape.

As explained above, the partial unit (II) includes the vertical-type circuit breaker 1 provided with the branch outlets 3 and 7, the current transformers 4 and 8, and the disconnectors 40 and 41 each provided with an earth switch. Further, the line-side devices such as the cable head 13, the line-side disconnector 14, and the voltage transformer 15 are connected so as to oppose the circuit breaker 1 while the disconnectors 40 and 41 are interposed therebetween.

Next, configurations of the devices including the partial unit (III) will be explained. Some of the constituent elements that are the same as those in the partial units (I) and (II) will be referred to by using the same reference characters. As shown in FIG. 12, the operating device 2 and the vertical-type circuit breaker 1 are provided in sequence on the supporting base 36. The operating device 2 is an operating device for the circuit breaker 1. Like in the partial unit (II), the branch outlets 3 and 7 are provided on a lateral face of the circuit breaker 1 while having an interval H therebetween. The current transformer 4 and the disconnector 40 with an earth switch are connected in series to the branch outlet 3 in sequence, whereas the current transformer 8 and the disconnector 41 with an earth switch are connected in series to the branch outlet 7 in sequence.

The operating device 43 for operating the disconnector 40 is provided on top of the disconnector 40. In addition, the connection bus 45 is connected to the disconnector 40 while extending in a direction that is orthogonal to the circuit breaker 1 and the current transformers 4 and 8. As explained above, the connection bus 45 connects the partial unit (III) and the partial unit (II) together. The lower main bus 12 is provided below the disconnector 40. The lower main bus 12 is positioned below the connection bus 45 while having an interval 2H therebetween.

An operating device 44 for operating the disconnector 41 is provided on top of the disconnector 41. Further, the upper main bus 11 is connected to the disconnector 41 via a connection terminal 49 provided for the disconnector 41. It should be noted that no line-side devices are provided so as to oppose the partial unit (III).

Next, a layout according to the second embodiment will be explained in detail, with reference to FIGS. 8 and 9. As shown in FIGS. 8 and 9, in the 1-½-CB-type gas insulated switchgear according to the second embodiment, for example, two integral units are arranged side by side. Each of the integral units includes the partial unit (I), the partial unit (II), and the partial unit (III). Further, throughout both of the two integral units, the intervals between two partial units are configured so as to be regular intervals each of which can be expressed as W.

Next, a positional relationship between the partial unit (I) and the partial unit (II) will be explained. The partial units (I) and (II) are positioned in such a manner that the height of the disconnector 40, which is the lower disconnector included in the partial unit (II), is equal to the height of the disconnector 41, which is the upper disconnector included in the partial unit (I). In other words, the circuit breaker 1 included in the partial unit (I) is installed directly on the installation surface 100, whereas the circuit breaker 1 included in the partial unit (II) is installed while the operating device 2 is interposed underneath the circuit breaker 1, so that the relative heights can be adjusted. Further, the disconnector 41 included in the partial unit (I) and the disconnector 40 included in the partial unit (II) are connected to each other at the same height level by the connection bus 42.

Next, a positional relationship between the partial unit (II) and the partial unit (III) will be explained. The partial units (II) and (III) are positioned in such a manner that the height of the disconnector 41, which is the upper disconnector included in the partial unit (II), is equal to the height of the disconnector 40, which is the lower disconnector included in the partial unit (III). In other words, the circuit breaker 1 included in the partial unit (II) is installed while the operating device 2 is interposed underneath the circuit breaker 1, whereas the circuit breaker 1 included in the partial unit (III) is installed on the operating device 2, which is supported by the supporting base 36, so that the relative heights can be adjusted. Further, the disconnector 41 included in the partial unit (II) and the disconnector 40 included in the partial unit (III) are connected to each other at the same height level by the connection bus 45. To clearly indicate the relative positional relationships among the partial units, in the drawing of the partial unit (III) in FIG. 8, the upper disconnector 41 and the lower disconnector 40 are mainly shown, while the circuit breaker 1, the operating device 2, and the supporting base 36 are omitted from the drawing.

The circuit breakers 1 included in the partial units (I), (II), and (III) are positioned so as to be parallel to one another, while the branch outlets 3 and 7 of the circuit breakers 1 are all oriented in the same direction. In other words, the partial units (I), (II), and (III) are arranged in a direction that is orthogonal to the branching direction of the branch outlets 3 and 7, i.e., a direction that is orthogonal to the circuit breaker 1 and the current transformers 4 and 8. Further, as explained above, the height-direction positions of the circuit breakers 1 are configured so as to become higher sequentially from the partial unit (I) to the partial unit (III). In FIGS. 8 and 9, two integral units each of which includes the partial units (I), (II), and (III) that are configured as described above are arranged side by side.

The upper main bus 11 is connected to the disconnector positioned in the uppermost level in each of the integral units (i.e., the disconnectors 41 included in the partial units (III)) at the same height level. The disconnectors 41 included in the partial units (III) are the disconnectors that are not connected to the upper disconnectors 41 included in the partial units (II). Further, the lower main bus 12 is connected to the disconnector positioned in the lowermost level in each of the integral units (i.e., the disconnectors 40 included in the partial units (I)) at the same height level. The disconnectors 40 included in the partial units (I) are the disconnectors that are not connected to the lower disconnectors 40 included in the partial units (II). As explained above, each of the disconnectors 41 included in the partial units (III) has the upper main bus 11 integrally and linearly connected thereto while using a connection mode in which a T-shaped branch structure is formed with respect to the connection direction in which the disconnector 41 is connected to the current transformer 8. As a result, it is possible to arrange the upper main bus 11 linearly throughout the plurality of integral units. The same applies to the lower main bus 12. In other words, each of the disconnectors 40 included in the partial units (I) has the lower main bus 12 integrally and linearly connected thereto while using a connection mode in which a T-shaped branch structure is formed with respect to the connection direction in which the disconnector 40 is connected to the current transformer 4. As a result, it is possible to arrange the lower main bus 12 linearly throughout the plurality of integral units.

With regard to the partial unit (I), the line-side devices are provided so as to oppose the circuit breaker 1 while the disconnectors 40 and 41 are interposed therebetween. The same positional arrangement also applies to the partial unit (II). Accordingly, due to the 1-½-CB-type configuration, no line-side devices are provided for the partial unit (III). As described here, one set of line-side devices is connected to each of the disconnectors included in two of the partial units (I), (II), and (III) while opposing the current-transformer-side connection face. Further, throughout the plurality of integral units, the partial units to which no line-side devices are connected are arranged at regular intervals in the direction in which the partial units are arranged. For example, in the example shown in FIG. 9, no line-side devices are connected to the partial units (III) in both of the two integral units.

As explained above, the interval between the disconnectors connected to each of the circuit breakers 1 included in the partial units (I), (II), and (III) is configured so as to be H, while the height-direction positions of the circuit breakers 1 are configured so as to sequentially become higher by H from the partial unit (I) to the partial unit (III). Further, the interval between the upper main bus 11 and the lower main bus 12 is configured so as to be 3H, while each of the disconnectors 40 included in the partial units (I) is connected to the lower main bus 12, whereas each of the disconnectors 41 included in the partial units (III) is connected to the upper main bus 11. This configuration is desirable from the aspect of standardizing the circuit breaker modules.

In the example shown in FIGS. 8 and 9, the partial units are arranged in the following order from the left-hand side to the right-hand side of the drawings: the partial unit (I), the partial unit (II), and the partial unit (III); however, needless to say, it is possible to arrange the partial units in the reverse order.

According to the second embodiment, with regard to the plurality of integral units each of which includes the partial units (I), (II), and (III), the two branch outlets 3 and 7 of the circuit breakers 1 included in the partial units are all oriented in the same direction while the partial units are linearly arranged in the direction that is orthogonal to the orientation direction. Further, the line-side devices are provided so as to oppose the circuit breakers 1 while the disconnectors 40 and 41 are interposed therebetween. Thus, the devices are gathered on the front and the rear faces of the partial units. In other words, the circuit breakers 1 are principally positioned on the front face side of the partial units, whereas the line-side devices are principally positioned on the rear face side of the partial units. As a result, it is possible to easily reach the devices including these elements, and the configuration naturally makes it possible to secure the space that is required by the maintenance and inspection processes. For example, in FIG. 9, there is no need to particularly provide the space used for performing maintenance and inspection processes on the circuit breaker 1 and the earth switches 16 and 27. It is possible to easily reach the operating devices for operating these devices. As explained here, according to the second embodiment, because the devices are gathered on the front and the rear faces of the partial units, there is no need to provide another space used for performing the maintenance and inspection processes on the devices. Thus, it is possible to reduce the installation space.

In addition, according to the second embodiment, because the partial units are arranged side by side, it is possible to reduce the dimension between the partial units and the dimension in the lengthwise direction of the partial units. As a result, it is possible to integrate the layout of the entire electricity supply station in which the gas insulated switchgear is installed. An advantageous effect is therefore achieved where it is possible to save space easily. This arrangement is effective especially when cable connections are used on the line side. Further, because the circuit breakers 1 are of the vertical type, the installation space in the electricity supply station does not increase even if the circuit breakers 1 are arranged, like in the second embodiment, in such a manner that the heights thereof are different from one another in the axial direction of thereof. It should be noted, however, that, in the case where the gas insulated switchgear is installed within a building, this arrangement is possible when the height of the building has no limitation.

Further, according to the second embodiment, the vertical-type circuit breakers 1 each having the two branch outlets 3 and 7 that are provided while arranging one above the other with an interval therebetween are used, so that a current transformer and a disconnector are connected in series to each of the two branch outlets. Because of such a structure of each of the circuit breakers 1, there is no need to provide, on the inside of each of the circuit breakers 1, a folded structure of conductors or the like, and it is therefore possible to simplify the structure used for guiding the conductors. Thus, it is possible to reduce the diameter of the circuit breakers. As a result, it is possible to shorten the intervals between the units and to further reduce the installation space.

Further, according to the second embodiment, each of the disconnectors 40 and 41 has the T-shaped branch structure. As a result, it is possible to reduce the number of tanks and spacers used for connecting the devices to one another. Thus, it is possible not only to reduce the installation space, but also to reduce the costs. Furthermore, it is possible to arrange the upper main bus 11 and the lower main bus 12 linearly and to minimize the lengths of the upper main bus 11 and the lower main bus 12. In addition, by using the T-shaped branch structures of the disconnectors 40 and 41, it is possible to provide additional integral units easily.

Furthermore, according to the second embodiment, one set of line-side devices is connected to each of the partial units. As a result, it is possible to reduce the dimension in the lengthwise direction of the partial units. Thus, it is possible to shorten the total length of the entire electricity supply station. Alternatively, another arrangement is also acceptable in which, for example, two sets of line-side devices are connected to one partial unit. As yet another arrangement, it is also acceptable to position the line-side devices between the partial units, by folding the structure back to the circuit breaker 1 side. This arrangement is suitable in a situation where the size of the line-side devices is large.

According to the second embodiment, one set of line-side devices is connected to each of two of the partial units (I), (II), and (III). Further, throughout the plurality of integral units, the partial units to which no line-side devices are connected are arranged at regular intervals in the direction in which the partial units are arranged. For example, in the example shown in FIG. 2, no line-side devices are connected to the partial units (III) in both of the two integral units. With this arrangement, because no line-side devices are connected to the partial units (III), an empty space is formed in the lengthwise direction of each of the partial units (III). By utilizing these empty spaces (e.g., by providing, in an integrated manner, an operation box that also functions for the adjacent partial units), it is possible to easily perform the maintenance and inspection processes not only on the disconnectors 40 and 41 included in the partial unit (III), but also on the disconnectors 40 and 41 included in the adjacent partial unit (I) and the disconnectors 40 and 41 included in the adjacent partial unit (II) on the opposite side. If such empty spaces were not positioned at regular intervals in the direction in which the partial units are arranged, there would be some disconnectors that are difficult to reach, and the convenience during the maintenance and inspection processes would be hampered. As explained here, because the partial units (I), (II), and (III) and the line-side devices are arranged with high density, there is no need to provide a space dedicated to the maintenance and inspection processes. Thus, it is possible to shorten, in particular, the intervals between the partial units.

Further, according to the second embodiment, the interval between the disconnectors connected to each of the circuit breakers 1 included in the partial units (I), (II), and (III) is configured so as to be H, whereas the interval between the upper main bus 11 and the lower main bus 12 is configured so as to be 3H. As a result, all the circuit breakers 1 that are used can be the same as one another. Consequently, it is possible to standardize the circuit breaker modules regarding the configurations of the buses. This arrangement contributes to integration of the positional arrangements and to cost reductions.

According to the second embodiment, for example, the path that extends from the disconnector 41 to the cable head 24 changes direction by 90 degrees at the line-side disconnector 25, so that the path substantially forms an L shape. As a result, it is possible to reduce the dimension in the lengthwise direction of the partial units and to shorten the total length of the electricity supply station.

In addition, according to the second embodiment, throughout the plurality of integral units, all the partial units are arranged at the regular intervals. As a result, it is possible to reduce the dimension between the units and to shorten the width of the electricity supply station.

In the sections above, the example of a three-phase system has been explained; however, the present invention is not limited to this example. It is possible to apply the present invention likewise to an isolated phase system.

Third Embodiment

Figure 13:
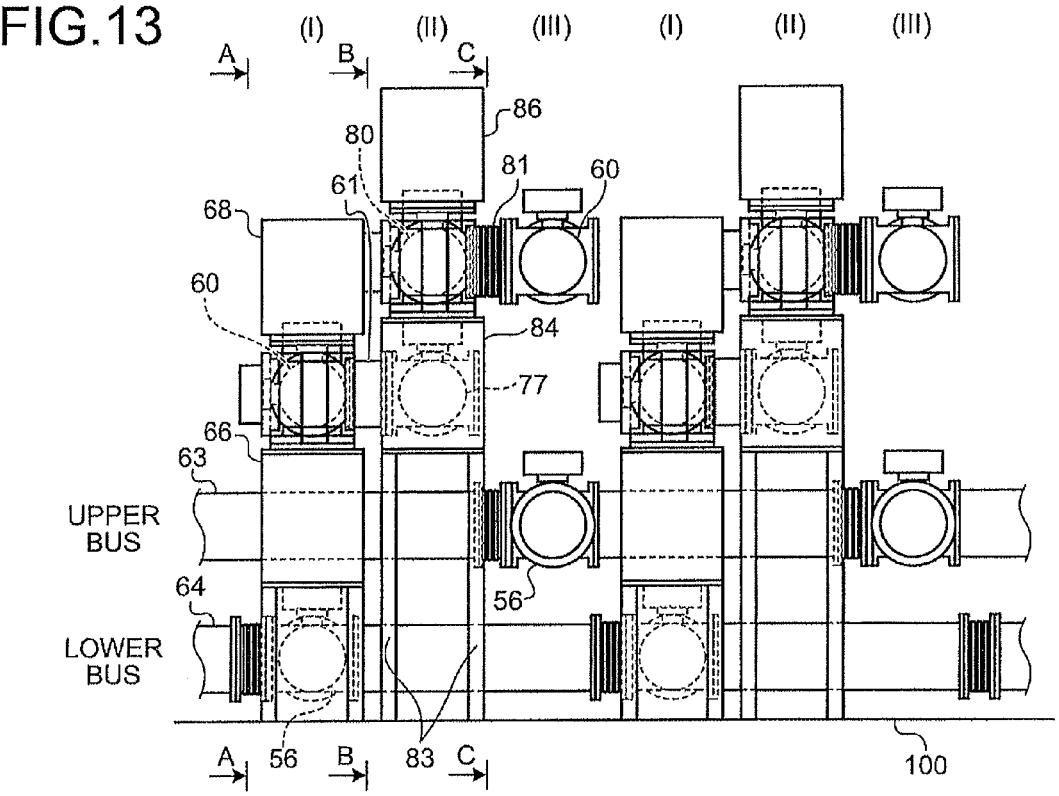
FIG. 13 is a front view of an example of a positional arrangement of 1-½-CB-type gas insulated switchgear according to the third embodiment.
Figure 14:
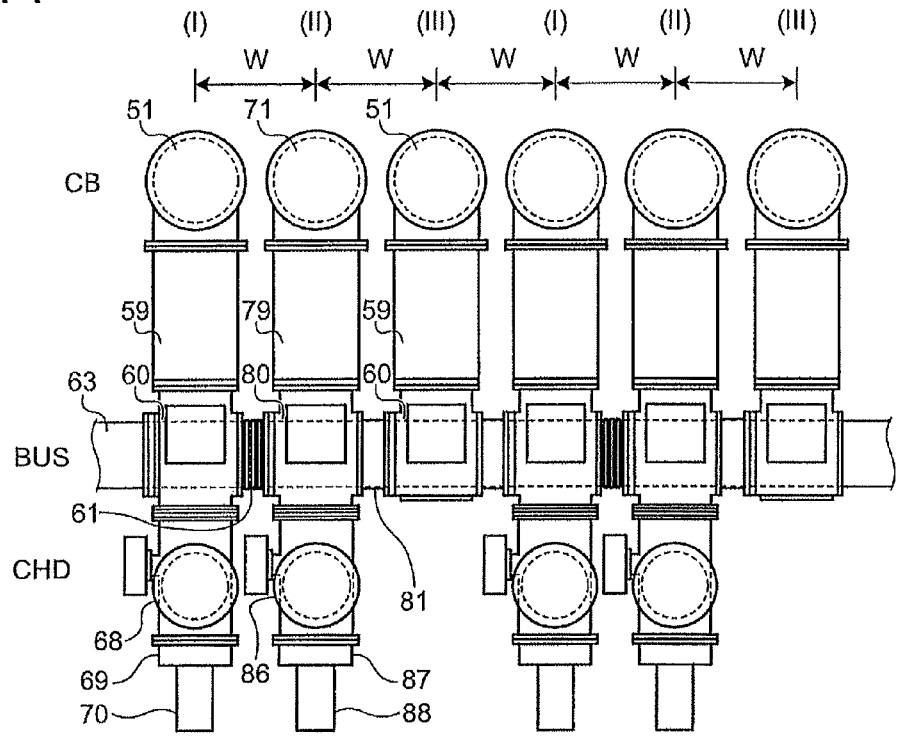
FIG. 14 is a top view corresponding to FIG. 13.
Figure 15:
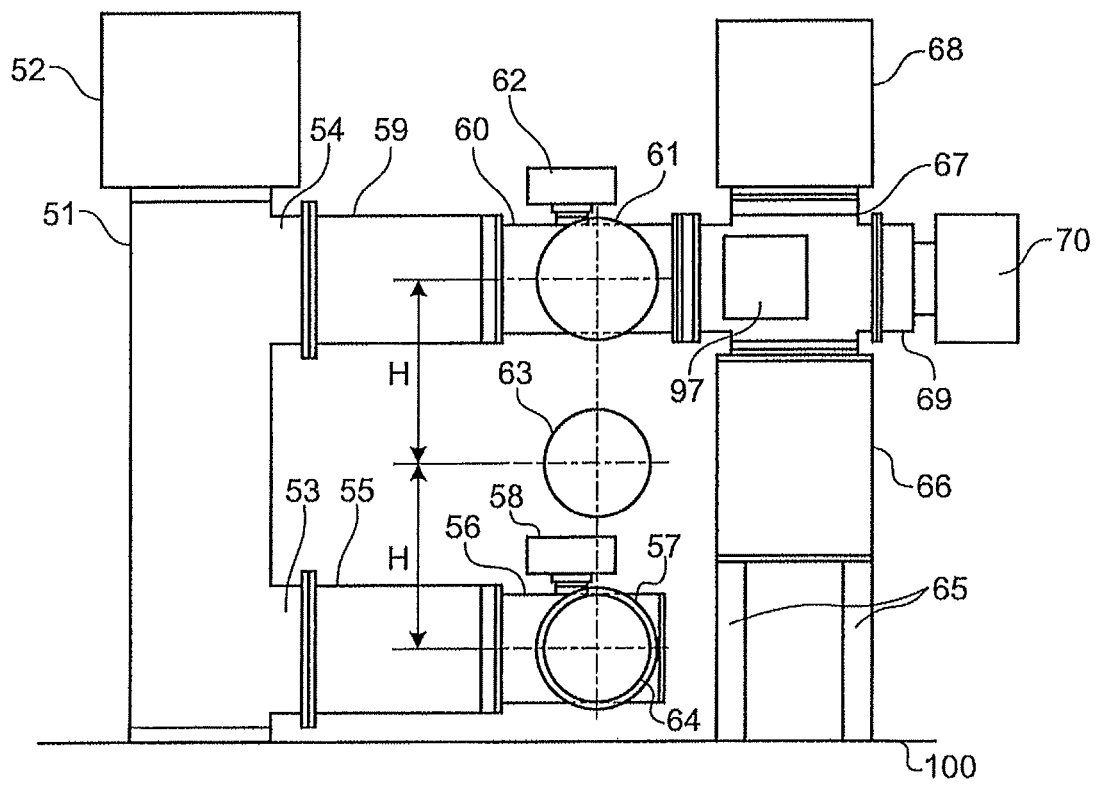
FIG. 15 is a cross-sectional view of a device configuration including a partial unit (I) included in the gas insulated switchgear according to the third embodiment and is a cross-sectional view at the line A-A in FIG. 13.
Figure 16:
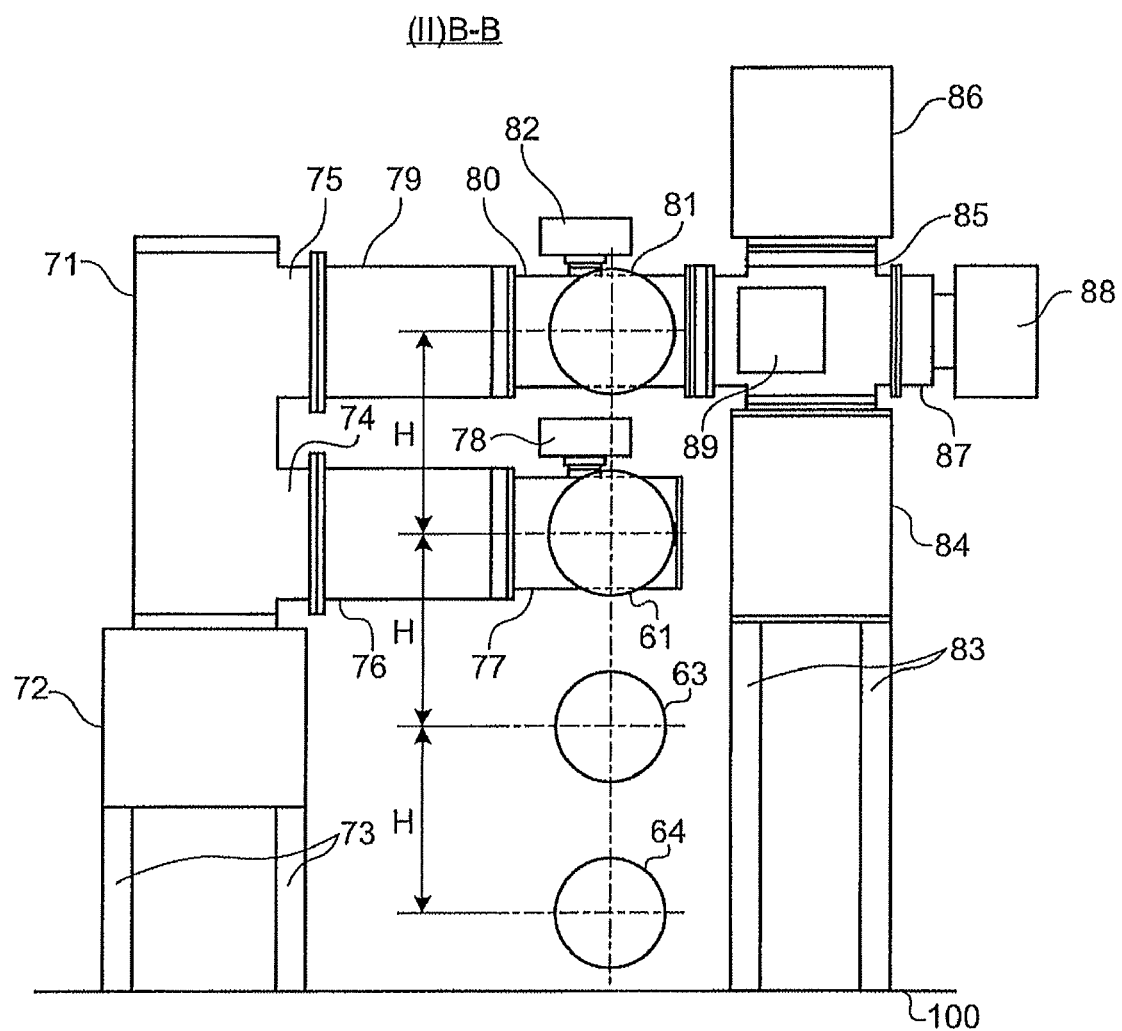
FIG. 16 is a cross-sectional view of a device configuration including a partial unit (II) included in the gas insulated switchgear according to the third embodiment and is a cross-sectional view at the line B-B in FIG. 13.

FIG. 13 is a front view of an example of a positional arrangement of 1-½-CB-type gas insulated switchgear according to a third embodiment of the present invention. FIG. 14 is a top view corresponding to FIG. 13. FIG. 15 is a cross-sectional view of a device configuration including a partial unit (I) included in the gas insulated switchgear according to the third embodiment and is a cross-sectional view at the line A-A in FIG. 13. FIG. 16 is a cross-sectional view of a device configuration including a partial unit (II) included in the gas insulated switchgear according to the third embodiment and is a cross-sectional view at the line B-B in FIG. 13. FIG. 17 is a cross-sectional view of a device configuration including a partial unit (III) included in the gas insulated switchgear according to the third embodiment and is a cross-sectional view at the line C-C in FIG. 13.

The 1-½-CB-type gas insulated switchgear according to the third embodiment is configured so as to include a plurality of integral units. Each of the integral units is structured by connecting partial units (I), (II), and (III) together in series, while line-side devices are configured so as to branch from a connection line that connects the partial units (I) and (II) together and from a connection line that connects the partial units (II) and (III) together. Each of the partial units (I), (II), and (III) is structured by connecting a current transformer and a disconnector with an earth switch in sequence to a circuit breaker on each of the two sides thereof. With regard to two main buses, one end of each of the integral units is connected to one of two main buses, whereas the other end of each of the integral units is connected to the other of the two main buses. Because the single-line wiring diagram according to the third embodiment is the same as the one shown in FIG. 7, the explanation thereof will be omitted.

Next, configurations of the devices including the configurations of the partial units (I), (II), and (III) will be explained in detail, with reference to FIGS. 15 to 17. After that, an overall layout will be explained, with reference to FIGS. 13 and 14.

First, a configuration of the devices including the partial unit (I) will be explained. As shown in FIG. 10, a circuit breaker 51 that has a circular cylindrical shape and has an operating device 52 therefor on top is provided so as to stand in such a manner that the axial line thereof extends perpendicular to the installation surface 100. In other words, the circuit breaker 51 is a vertical-type circuit breaker. A circuit breaking unit (not shown) is provided on the inside of the circuit breaker 51, which is a space filled with insulating and arc extinguishing gas such as $SF_6$.

On a lateral face of the circuit breaker 51, two branch outlets are provided while having an up-and-down-direction interval 2H therebetween, the two branch outlets namely being a branch outlet 53 provided in a lower position and a branch outlet 54 provided in an upper position. The branch outlets 53 and 54 are horizontally drawn out so as to branch from the lateral face of the circuit breaker 51 in the same direction.

A current transformer 55 and a disconnector 56 with an earth switch are connected to the branch outlet 53 in series in the stated order. An operating device 58 for operating the disconnector 56 is provided on top of the disconnector 56. A lower main bus 64, which is the lower one of two main buses that extend along each other while arranged one above the other with interval therebetween, is connected to the disconnector 56 via a connection terminal 57 provided for the disconnector 56.

A current transformer 59 and a disconnector 60 with an earth switch are connected to the branch outlet 54 in series in the stated order. A connection bus 61 extending in a direction that is orthogonal to the circuit breaker 51 and the current transformers 55 and 59 is connected to the disconnector 60. The connection bus 61 connects together the partial unit (I) and the partial unit (II) positioned adjacent to the partial unit (I). An operating device 62 for operating the disconnector 60 is provided on top of the disconnector 60.

An upper main bus 63, which is the upper one of the two main buses described above, is provided in a position in the middle of the disconnector 60 and the disconnector 56. In other words, the center of the cross section of the upper main bus 63 is positioned at the middle point of the straight line that connects the disconnector 60 and the disconnector 56 together. Accordingly, the distance H between the upper main bus 63 and the lower main bus 64 is a half of the distance 2H between the disconnector 60 and the disconnector 56. The upper main bus 63 and the lower main bus 64 are provided so as to extend horizontally and parallel to each other. The direction in which the upper main bus and the lower main bus extend is the same as the direction in which the connection bus 61 extends.

Opposing the circuit breaker 51 while the disconnectors 56 and 60 are interposed therebetween, cable head 66 is provided on a supporting base 65, a line-side disconnector 67 with an earth switch is connected on top of the cable head 66, an operating device 97 for the line-side disconnector 67 is provided on a lateral face of the line-side disconnector 67, and a voltage transformer 68 is provided on top of the line-side disconnector 67. Also, while being connected to the line-side disconnector 67, an earth switch 69 for a line-side earth is provided on another lateral face of the line-side disconnector 67 that is positioned on the opposite side from the circuit breaker 51. In addition, an operating device 70 for operating the earth switch 69 is provided. Further, the line-side disconnector 67 is connected to the disconnector 60, which is connected to the circuit breaker 51. The portion of the disconnector 60 connected to the disconnector 67 is positioned on the opposite side from the current transformer 59 so as to oppose the connection portion at which the disconnector 60 is connected to the current transformer 59. In other words, the disconnector 60 has a T-shaped branch structure in which a branch portion to which the current transformer 59 is connected and another branch portion to which the line-side disconnector 67 is connected are positioned so as to oppose each other, while the connection bus 61 is connected to the other branch portion that is orthogonal to these opposing branches. As explained here, the disconnector 60 branches in the shape of a T on a horizontal plane, which is positioned parallel to the installation surface 100.

A path that extends from the disconnector 60 to the cable head 66 changes direction by 90 degrees at the line-side disconnector 67, so that the path substantially forms an L shape.

As explained above, the partial unit (I) includes the vertical-type circuit breaker 51 provided with the branch outlets 53 and 54, the current transformers 55 and 59, and the disconnectors 56 and 60 each provided with an earth switch. Further, the line-side devices such as the cable head 66, the line-side disconnector 67, and the voltage transformer 68 are connected so as to oppose the circuit breaker 51 while the disconnectors 56 and 60 are interposed therebetween.

Next, configurations of the devices including the partial unit (II) will be explained. Some of the constituent elements that are the same as those in the partial unit (I) will be referred to by using the same reference characters. As shown in FIG. 16, a circuit breaker 71 that has a circular cylindrical shape is provided on a supporting base 73, while an operating device 72 is interposed therebetween. The circuit breaker 71 is a vertical-type circuit breaker that is provided so as to stand in such a manner that the axial line thereof extends perpendicular to the installation surface 100.

On a lateral face of the circuit breaker 71, two branch outlets are provided while having an up-and-down-direction interval H therebetween, the two branch outlets namely being a branch outlet 74 provided in a lower position and a branch outlet 75 provided in an upper position. The branch outlets 74 and 75 are horizontally drawn out so as to branch from the lateral face of the circuit breaker 71 in the same direction.

A current transformer 76 and a disconnector 77 with an earth switch are connected to the branch outlet 74 in series in the stated order. An operating device 78 for operating the disconnector 77 is provided on top of the disconnector 77.

A current transformer 79 and a disconnector 80 with an earth switch are connected to the branch outlet 75 in series in the stated order. An operating device 82 for operating the disconnector 80 is provided on top of the disconnector 80.

A connection bus 81 extending in a direction that is orthogonal to the circuit breaker 71 and the current transformers 76 and 79 is connected to the disconnector 80. The connection bus 81 connects together the partial unit (II) and the partial unit (III), which is positioned adjacent to the partial unit (II). The connection bus 61 extending in a direction that is orthogonal to the circuit breaker 71 and the current transformers 76 and 79 is connected to the disconnector 77. As explained above, the connection bus 61 connects the partial unit (II) and the partial unit (I) together. The connection bus 81 extends in a direction opposite from the direction in which the connection bus 61 extends.

Below the disconnector 77, the lower main bus 64 and the upper main bus 63 are provided so as to be stacked in the manner of layers, while having a interval H therebetween. Further, the disconnector 77 is positioned higher than the upper main bus 63 by the distance H. In other words, the lower main bus 64, the upper main bus 63, the disconnector 77, and the disconnector 80 are provided in the stated order from a lower position to an upper position, while having an interval H therebetween. The connection buses 81 and 61 extend parallel to the upper main bus 63 and the lower main bus 64.

Opposing the circuit breaker 71 while the disconnectors 77 and 80 each provided with an earth switch are interposed therebetween, a cable head 84 is provided on a supporting base 83, a line-side disconnector 85 with an earth switch is connected on top of the cable head 84, an operating device 89 for the line-side disconnector 85 is provided on a lateral face of the line-side disconnector 85, and a voltage transformer 86 is provided on top of the line-side disconnector 85. Also, while being connected to the line-side disconnector 85, an earth switch 87 for a line-side earth is provided on another lateral face of the line-side disconnector 85 that is positioned on the opposite side from the circuit breaker 71. In addition, an operating device 88 for operating the earth switch 87 is provided. Further, the line-side disconnector 85 is connected to the disconnector 80, which is connected to the circuit breaker 71. The portion of the disconnector 80 connected to the disconnector 85 is positioned on the opposite side from the current transformer 79 so as to oppose the connection portion at which the disconnector 80 is connected to the current transformer 79. In other words, the disconnector 80 has a T-shaped branch structure in which a branch portion to which the current transformer 79 is connected and another branch portion to which the line-side disconnector 85 is connected are positioned so as to oppose each other, while the connection bus 81 is connected to the other branch portion that is orthogonal to these opposing branches. As explained here, the disconnector 80 branches in the shape of a T on a horizontal plane that is positioned parallel to the installation surface 100.

A path that extends from the disconnector 80 to the cable head 84 changes direction by 90 degrees at the line-side disconnector 85, so that the path substantially forms an L shape.

As explained above, the partial unit (II) includes the vertical-type circuit breaker 71 provided with the branch outlets 74 and 75, the current transformers 76 and 79, and the disconnectors 77 and 80 each provided with an earth switch. Further, the line-side devices such as the cable head 84, the line-side disconnector 85, and the voltage transformer 86 are connected so as to oppose the circuit breaker 71 while the disconnectors 77 and 80 are interposed therebetween.

Next, configurations of the devices including the partial unit (III) will be explained. Some of the constituent elements that are the same as those in the partial units (I) and (II) will be referred to by using the same reference characters. As shown in FIG. 17, a vertical-type circuit breaker 51 is provided while an operating device 92 for operating the circuit breaker 51 is provided underneath the circuit breaker 51. Like in the partial unit (I), the branch outlets 53 and 54 are provided on a lateral face of the circuit breaker 51. The current transformer 55 and the disconnector 56 with an earth switch are connected in series to the branch outlet 53 in sequence, whereas the current transformer 59 and the disconnector 60 with an earth switch are connected in series to the branch outlet 54 in sequence.

The operating device 58 for operating the disconnector 56 is provided on top of the disconnector 56. Further, the upper main bus 63 is connected to the disconnector 56 via a connection terminal 98 provided for the disconnector 56, while extending in a direction that is orthogonal to the circuit breaker 51 and the current transformers 55 and 59. The lower main bus 64 is positioned below the upper main bus 63 while having the distance H therebetween.

The operating device 62 for operating the disconnector 60 is provided on top of the disconnector 60. Further, the connection bus 81 connecting the partial unit (III) and the partial unit (II) together is connected to the disconnector 60. The interval between the disconnector 60 and the disconnector 56 can be expressed as a distance 2H. It should be noted that no line-side devices are provided so as to oppose the partial unit (III).

Next, a layout according to the third embodiment will be explained in detail, with reference to FIGS. 13 and 14. As shown in FIGS. 13 and 14, in the 1-½-CB-type gas insulated switchgear according to the third embodiment, for example, two integral units are arranged side by side. Each of the integral units includes the partial unit (I), the partial unit (II), and the partial unit (III). Further, throughout both of the two integral units, the intervals between two partial units are configured so as to be regular intervals each of which can be expressed as W.

Next, a positional relationship between the partial unit (I) and the partial unit (II) will be explained. The lower disconnector 56 included in the partial unit (I) is connected to the lower main bus 64. The distance between the upper disconnector 60 and the lower disconnector 56 included in the partial unit (I) is configured so as to be 2H, which is longer than the distance H between the upper main bus 63 and the lower main bus 64, which are positioned in the lower layers. As a result, the upper disconnector 60 included in the partial unit (I) is positioned above the upper main bus 63. Further, the height of the supporting base 83 is adjusted in such a manner that the height of the lower disconnector 77 included in the partial unit (II) is equal to the height of the upper disconnector 60 included in the partial unit (I). In addition, the disconnector 60 included in the partial unit (I) and the disconnector 77 included in the partial unit (II) are connected to each other at the same height level by the connection bus 61.

Next, a positional relationship between the partial unit (II) and the partial unit (III) will be explained. The upper disconnector 80 included in the partial unit (II) is positioned higher than the lower disconnector 77 by the distance H. Further, the lower disconnector 56 included in the partial unit (III) is connected to the upper main bus 63, whereas the upper disconnector 60 included in the partial unit (III) is positioned higher than the lower disconnector 56 by the distance 2H. As a result, the height of the upper disconnector 80 included in the partial unit (II) is equal to the height of the upper disconnector 60 included in the partial unit (III). Thus, the disconnector 80 included in the partial unit (II) and the disconnector 60 included in the partial unit (III) are connected to each other at the same height level by the connection bus 81. To clearly indicate the relative positional relationships among the partial units, in the drawing of the partial unit (III) in FIG. 13, the upper disconnector 60 and the lower disconnector 56 are mainly shown, while the circuit breaker 51 and the operating device 92 are omitted from the drawing.

As apparent in FIG. 14, the circuit breaker 51 included in the partial unit (I), the circuit breaker 71 included in the partial unit (II), and the circuit breaker 51 included in the partial unit (III) are positioned so as to be parallel to one another, while the branch outlets thereof are oriented in the same direction, whereas the circuit breakers are arranged in a direction that is orthogonal to the orientation direction. In FIGS. 13 and 14, two integral units each of which includes the partial units (I), (II), and (III) that are configured as described above are arranged side by side.

With regard to the partial unit (I), the line-side devices are provided so as to oppose the circuit breaker 51 while the disconnectors 56 and 60 are interposed therebetween. The same positional arrangement also applies to the partial unit (II). Accordingly, due to the 1-½-CB-type configuration, no line-side devices are provided for the partial unit (III). As described here, one set of line-side devices is connected to each of the disconnectors included in two of the partial units (I), (II), and (III), on a lateral face that opposes the current-transformer-side connection face. Further, throughout the plurality of integral units, the partial units to which no line-side devices are connected are arranged at regular intervals in the direction in which the partial units are arranged. For example, in the example shown in FIG. 14, no line-side devices are connected to the partial units (III) in both of the two integral units.

As explained above, the axial length of the circuit breaker 51 included in the partial unit (I) is configured so as to be longer than the axial length of the circuit breaker 71 included in the partial unit (II), so that the connection between the disconnector 60 included in the partial unit (I) and the disconnector 77 included in the partial unit (II) is made above the upper main bus 63. Further, the interval between the disconnectors connected to the circuit breaker 51 included in the partial unit (I) is configured so as to be 2H, whereas the interval between the disconnectors connected to the circuit breaker 71 included in the partial unit (II) is configured so as to be H, while the interval between the disconnectors connected to the circuit breaker 51 included in the partial unit (III) is configured so as to be 2H, and the interval between the upper main bus 63 and the lower main bus 64 is configured so as to be H. This configuration is desirable from the aspect of standardizing the circuit breaker modules.

In the example shown in FIGS. 13 and 14, the partial units are arranged in the following order from the left-hand side to the right-hand side of the drawings: the partial unit (I), the partial unit (II), and the partial unit (III); however, needless to say, it is possible to arrange the partial units in the reverse order. In addition, to obtain the connection mode in which the lower disconnector 56 included in the partial unit (I) is connected to the lower main bus 64, while the connection between the partial unit (I) and the partial unit (II) is made above the upper main bus 63, whereas the lower disconnector 56 included in the partial unit (III) is connected to the upper main bus 63, the connection mode is not limited to the example shown in FIGS. 13 and 14. It is acceptable to adopt other connection modes. For example, another arrangement is acceptable in which the upper disconnector 60 included in the partial unit (I) is connected to the upper disconnector 80 included in the partial unit (II), whereas the lower disconnector 77 included in the partial unit (II) is connected to the upper disconnector 60 included in the partial unit (III). In this situation, however, some adjustments as follows, for example, need to be made: the axial length of the circuit breaker 51 included in the partial unit (I) is configured so as to be longer, so that the interval between the disconnectors becomes longer as necessary; the position of the circuit breaker 71 included in the partial unit (II) is configured so as to be higher, while the axial length of the circuit breaker 71 is configured so as to be longer, so that the interval between the disconnectors becomes longer as necessary; and the axial length of the circuit breaker 51 included in the partial unit (III) is configured so as to be shorter, so that the interval between the disconnectors becomes shorter as necessary. In this situation also, the axial length of the circuit breaker 51 included in the partial unit (I) is longer than the axial length of the circuit breaker 71 included in the partial unit (II).

According to the third embodiment, with regard to the plurality of integral units each of which includes the partial units (I), (II), and (III), the two branch outlets of the circuit breakers included in the partial units are all oriented in the same direction, while the partial units are linearly arranged in the direction that is orthogonal to the orientation direction. Further, the line-side devices are provided so as to oppose the circuit breakers while the disconnectors are interposed therebetween. Thus, the devices are gathered on the front and the rear faces of the partial units. In other words, the circuit breakers are principally positioned on the front face side of the partial units, whereas the line-side devices are principally positioned on the rear face side of the partial units. As a result, it is possible to easily reach the devices including these elements, and the configuration naturally makes it possible to secure the space that is required by the maintenance and inspection processes. For example, in FIG. 14, there is no need to particularly provide a space dedicated to perform maintenance and inspection processes on the circuit breaker 51 and the earth switches 69 and 87. It is possible to easily reach the operating devices for operating these devices. As explained here, according to the third embodiment, because the devices are gathered on the front and the rear faces of the partial units, there is no need to separately provide another space used for performing the maintenance and inspection processes on the devices. Thus, it is possible to reduce the installation space.

In addition, according to the third embodiment, because the partial units are arranged side by side, it is possible to reduce the dimension between the partial units and the dimension in the lengthwise direction of the partial units. As a result, it is possible to integrate the layout of the entire electricity supply station in which the gas insulated switchgear is installed. An advantageous effect is therefore achieved where it is possible to save space easily. This arrangement is effective especially when cable connections are used on the line side. Further, because the circuit breakers 51 and 71 are of the vertical type, the installation space in the electricity supply station does not increase even if the circuit breakers 51 and 71 are arranged, like in the third embodiment, in such a manner that the heights thereof are different from one another in the axial direction of thereof. It should be noted, however, that, in the case where the gas insulated switchgear is installed within a building, this arrangement is possible when the height of the building has no limitation.

Further, according to the third embodiment, the vertical-type circuit breakers 51 and 71 each having the two branch outlets 3 and 7 that are provided while having the up-and-down direction interval therebetween are used, so that a current transformer and a disconnector are connected in series to each of the two branch outlets. Because of such a structure of each of the circuit breakers 51 and 71, there is no need to provide, on the inside of each of the circuit breakers 51 and 71, a folded structure of conductors or the like, and it is therefore possible to simplify the structure used for guiding the conductors. Thus, it is possible to reduce the diameter of the circuit breakers. As a result, it is possible to shorten the intervals between the units and to further reduce the installation space.

Further, according to the third embodiment, each of the disconnectors 56 and 60 has the T-shaped branch structure. As a result, it is possible to reduce the number of tanks and spacers used for connecting the devices to one another. Thus, it is possible not only to reduce the installation space, but also to reduce the costs. Furthermore, it is possible to arrange the upper main bus 63 and the lower main bus 64 linearly and to minimize the lengths of the upper main bus 63 and the lower main bus 64. In addition, by using the T-shaped branch structures of the disconnectors 56 and 60, it is possible to provide additional integral units easily.

Furthermore, according to the third embodiment, one set of line-side devices is connected to each of the partial units. As a result, it is possible to reduce the dimension in the lengthwise direction of the partial units. Thus, it is possible to shorten the total length of the entire electricity supply station. Alternatively, another arrangement is also acceptable in which, for example, two sets of line-side devices are connected to one partial unit. As yet another arrangement, it is also acceptable to position the line-side devices between the partial units, by folding the structure back to the circuit breaker 1 side. This arrangement is suitable in a situation where the size of the line-side devices is large.

According to the third embodiment, one set of line-side devices is connected to each of two of the partial units (I), (II), and (III). Further, throughout the plurality of integral units, the partial units to which no line-side devices are connected are arranged at regular intervals in the direction in which the partial units are arranged. For example, in the example shown in FIG. 14, no line-side devices are connected to the partial units (III) in both of the two integral units. With this arrangement, because no line-side devices are connected to the partial units (III), an empty space is formed in the lengthwise direction of each of the partial units (III). By utilizing these empty spaces (e.g., by providing, in an integrated manner, an operation box that also functions for the adjacent partial units), it is possible to easily perform the maintenance and inspection processes not only on the disconnectors 60 and 56 included in the partial unit (III), but also on the disconnectors 60 and 56 included in the adjacent partial unit (I) and the disconnectors 80 and 77 included in the adjacent partial unit (II) on the opposite side. If such empty spaces were not positioned at regular intervals in the direction in which the partial units are arranged, there would be some disconnectors that are difficult to reach, and the convenience during the maintenance and inspection processes would be hampered. As explained here, because the partial units (I), (II), and (III) and the line-side devices are arranged with high density, there is no need to provide a space dedicated to the maintenance and inspection processes. Thus, it is possible to shorten, in particular, the intervals between the partial units.

According to the third embodiment, because the upper main bus 63 and the lower main bus 64 are positioned in the lower layers, quake-resistance properties are improved.

Further, according to the third embodiment, the interval between the disconnectors connected to the circuit breaker 51 included in the partial units (I) is configured so as to be 2H, whereas the interval between the disconnectors connected to the circuit breaker 71 included in the partial unit (II) is configured so as to be H, while the interval between the disconnectors connected to the circuit breaker 51 included in the partial unit (III) is configured so as to be 2H, and the interval between the upper main bus 63 and the lower main bus 64 is configured so as to be H. As a result, it is possible to standardize the circuit breaker modules including the configurations of the buses. This arrangement contributes to integration of the positional arrangements and to cost reductions.

According to the third embodiment, for example, the path that extends from the disconnector 60 to the cable head 66 changes direction by 90 degrees at the line-side disconnector 67, so that the path substantially forms an L shape. As a result, it is possible to reduce the dimension in the lengthwise direction of the partial units and to shorten the total length of the electricity supply station.

In addition, according to the third embodiment, throughout the plurality of integral units, all the partial units are arranged at the regular intervals. As a result, it is possible to reduce the dimension between the units and to shorten the width of the electricity supply station.

In the sections above, the example of a three-phase system has been explained; however, the present invention is not limited to this example. It is possible to apply the present invention likewise to an isolated phase system.

INDUSTRIAL APPLICABILITY

As explained above, the gas insulated switchgear according to an aspect of the present invention is suitable for reducing the installation space in electricity supply stations such as substations and electric power plants.

The invention claimed is:

1. Gas insulated switchgear including a plurality of integral units, in each of which a first partial unit, a second partial unit, and a third partial unit are connected in series in sequence while line-side devices are branched from a position between the first partial unit and the second partial unit and from a position between the second partial unit and the third partial unit, each of the first, the second, and the third partial units including: a circuit breaker of a vertical type having two branch outlets formed of upper and lower branch outlets that horizontally branch from a lateral face of the circuit breaker in a same direction; a current transformer and an upper disconnector that are connected in sequence to the upper branch outlet; and another current transformer and a lower disconnector that are connected in sequence to the lower branch outlet, one end of each of the integral units being connected to an upper main bus, whereas other end of each of the integral units being connected to a lower main bus, the upper and lower main buses being provided in an upper position and a lower position, respectively, wherein the first, the second, and the third partial units are arranged in an arranged direction side by side such that heights of the circuit breakers are equal to one another and that the two branch outlets therein are oriented in a same direction, the lower disconnector included in the second partial unit and the lower disconnector included in the first or the third partial unit are at a same height and are connected by a connection bus, whereas the upper disconnector included in the second partial unit and the upper disconnector included in the first or the third partial unit, which is not connected to the lower disconnector included in the second partial unit, are at a same height and are connected by a connection bus, the upper and lower disconnectors in each of the first, the second, and the third partial units are interposed between the upper and lower main buses extending in the arranging direction, the upper disconnector included in the first or the third partial unit that is connected to the lower disconnector included in the second partial unit is connected to the upper main bus via a T-shaped branch structure provided on the upper main bus, and the lower disconnector included in the first or the third partial unit that is connected to the upper disconnector included in the second partial unit is connected to the lower main bus via a T-shaped branch structure provided on the lower main bus.

2. The gas insulated switchgear according to claim 1, wherein the line-side devices are each connected to the upper or the lower disconnector included in two of the first, the second, and the third partial units, on a lateral face of the disconnector that opposes another lateral face on which a corresponding one of the current transformers is connected, and throughout the plurality of integral units, the partial units to which no line-side devices are connected, are arranged at regular intervals.

3. The gas insulated switchgear according to claim 2, wherein a path that extends from the disconnector, to which any of the line-side devices is connected, to the line-side device includes an L-shaped path.

4. Gas insulated switchgear including a plurality of integral units, in each of which a first partial unit, a second partial unit, and a third partial unit are connected in series in sequence while line-side devices are branched from a position between the first partial unit and the second partial unit and from a position between the second partial unit and the third partial unit, each of the first, the second, and the third partial units including: a circuit breaker of a vertical type having two branch outlets formed of upper and lower branch outlets that horizontally branch from a lateral face of the circuit breaker in a same direction; a current transformer and an upper disconnector that are connected in sequence to the upper branch outlet; and another current transformer and a lower disconnector that are connected in sequence to the lower branch outlet, one end of each of the integral units being connected to an upper main bus, whereas other end of each of the integral units being connected to a lower main bus, the upper and lower main buses being provided in an upper position and a lower position, respectively, wherein the first, the second, and the third partial units are linearly arranged in an arranging direction that is orthogonal to an orientation direction in which the two branch outlets of the first, second, and third partial units are oriented, the upper main bus and the lower main bus extend in the arranging direction, the lower disconnector included in the second partial unit and the upper disconnector included in the first or the third partial unit are at a same height and are connected by a connection bus, whereas the upper disconnector included in the second partial unit and the lower disconnector included in the first or the third partial unit, which is not connected to the lower disconnector included in the second partial unit, are at a same height and are connected by a connection bus, the upper disconnector included in the first or the third partial unit, which is connected to the upper disconnector included in the second partial unit, is connected to the upper main bus at a same height level, whereas the lower disconnector included in the first or the third partial unit, which is connected to the lower disconnector included in the second partial unit, is connected to the lower main bus at a same height level, and the line-side devices oppose the circuit breakers while interposing the upper main bus and the lower main bus therebetween.

5. The gas insulated switchgear according to claim 4, wherein each of the disconnectors that are respectively connected to the upper and lower main buses is configured to integrally and lineally connect the main bus using a T-shaped branch structure in which the main bus branches in a form of T from a direction along which the disconnector is connected to a corresponding one of the current transformer.

6. The gas insulated switchgear according to claim 4, wherein an interval between the upper disconnector and the lower disconnector is equal in all of the first, the second, and the third partial units.

7. The gas insulated switchgear according to claim 4, wherein the line-side devices are each connected to the upper or the lower disconnector, which is included in two of the first, the second, and the third partial units, on a lateral face of the disconnector that opposes another lateral face on which a corresponding one of the current transformers is connected, and throughout the plurality of integral units to which no line-side devices are connected, are arranged at regular intervals.

8. The gas insulated switchgear according to claim 7, wherein a path that extends from the disconnector, to which any of the line-side devices is connected, to the line-side device includes an L-shaped path.

9. Gas insulated switchgear including a plurality of integral units, in each of which a first partial unit, a second partial unit, and a third partial unit are connected in series in sequence while line-side devices are branched from a position between the first partial unit and the second partial unit and from a position between the second partial unit and the third partial unit, each of the first, the second, and the third partial units including: a circuit breaker of a vertical type having two branch outlets formed of upper and lower branch outlets that horizontally branch from a lateral face of the circuit breaker in a same direction; a current transformer and an upper disconnector that are connected in sequence to the upper branch outlet; and another current transformer and a lower disconnector that are connected in sequence to the lower branch outlet, one end of each of the integral units being connected to an upper main bus, whereas other end of each of the integral units being connected to a lower main bus, the upper and lower main buses being provided in an upper position and a lower position, respectively, wherein the first, the second, and the third partial units are linearly arranged in an arranging direction that is orthogonal to an orientation direction in which the two branch outlets of the first, the second, and the third partial units are oriented, the upper main bus and the lower main bus extend in the arranging direction, the lower disconnector included in the first or the third partial unit is connected to the upper main bus at a same height level, whereas the lower disconnector included in the first or the third partial unit that is not connected to the upper main bus is connected to the lower main bus at a same height level, and the line-side devices are provided so as to oppose the circuit breakers while interposing the upper main bus and the lower main bus therebetween.

10. The gas insulated switchgear according to claim 9, wherein an interval between the upper disconnector and the lower disconnector that are connected to the circuit breaker, which is included in at least one of the first and the third partial units, is longer than an interval between the upper disconnector and the lower disconnector that are connected to the circuit breaker, which is included in the second partial unit, and one of the two disconnectors included in the second partial unit is connected to the upper disconnector included in the first partial unit in a position higher than the upper main bus, whereas other of the two disconnectors included in the second partial unit is connected to the upper disconnector included in the third partial unit in a position higher than the upper main bus.

11. The gas insulated switchgear according to claim 10, wherein the interval between the upper disconnector and the lower disconnector included in the second partial unit is equal to an interval between the upper main bus and the lower main bus, and an interval between the upper disconnector and the lower disconnector included in each of the first and the third partial units is twice as long as the interval between the upper main bus and the lower main bus.

12. The gas insulated switchgear according to claim 9, wherein the line-side devices are each connected to the upper or the lower disconnector, which is included in two of the first, the second, and the third partial units, on a lateral face of the disconnector that opposes another lateral face on which a corresponding one of the current transformers is connected, and throughout the plurality of integral units to which no line-side devices are connected, are arranged at regular intervals.

13. The gas insulated switchgear according to claim 12, wherein a path that extends from the disconnector, to which any of the line-side devices is connected, to the line-side device includes an L-shaped path.

14. The gas insulated switchgear according to claim 1, wherein intervals between any two of the first, the second, and the third partial units that are positioned adjacent to each other are configured so as to be regular intervals throughout the plurality of integral units.

15. The gas insulated switchgear according to claim 4, wherein intervals between any two of the first, the second, and the third partial units that are positioned adjacent to each other are configured so as to be regular intervals throughout the plurality of integral units.

16. The gas insulated switchgear according to claim 9, wherein intervals between any two of the first, the second, and the third partial units that are positioned adjacent to each other are configured so as to be regular intervals throughout the plurality of integral units.

* * * * *